(12) United States Patent
Ho et al.

(10) Patent No.: US 7,793,850 B1
(45) Date of Patent: Sep. 14, 2010

(54) SYSTEM AND METHOD USED FOR CONFIGURATION OF AN INSPECTION COMPLIANCE TOOL WITH MACHINE READABLE TAGS AND THEIR ASSOCIATIONS TO INSPECTED COMPONENTS

(75) Inventors: Albert Ho, Boston, MA (US); Marc Siegel, Boston, MA (US); Christopher Tossing, Ashland, MA (US); Adam Ierymenko, Jamaica Plain, MA (US); Daniar Hussain, Pittsburgh, PA (US)

(73) Assignee: KD Secure LLC, Boston, MA (US)

( * ) Notice: Subject to any disclaimer, the term of this patent is extended or adjusted under 35 U.S.C. 154(b) by 0 days.

(21) Appl. No.: 12/723,674

(22) Filed: Mar. 14, 2010

(51) Int. Cl.
*G06F 19/00* (2006.01)
*G06K 19/06* (2006.01)

(52) U.S. Cl. .............................. 235/492; 235/385

(58) Field of Classification Search .............. 235/385, 235/383, 375, 492, 486, 382; 40/654, 654.01; 709/203; 702/127, 183, 182
See application file for complete search history.

(56) References Cited

U.S. PATENT DOCUMENTS

| | | | |
|---|---|---|---|
| 7,557,696 B2 | 7/2009 | Brinton et al. | |
| 2003/0167187 A1* | 9/2003 | Bua | 705/2 |
| 2005/0231387 A1* | 10/2005 | Markelz | 340/937 |
| 2006/0155427 A1* | 7/2006 | Yang | 701/1 |
| 2006/0255119 A1* | 11/2006 | Marchasin et al. | 235/375 |
| 2008/0051996 A1* | 2/2008 | Dunning et al. | 701/211 |
| 2010/0039259 A1* | 2/2010 | Hazzani | 340/541 |
| 2010/0119341 A1* | 5/2010 | Flood et al. | 414/406 |
| 2010/0120538 A1* | 5/2010 | DeWitt | 463/42 |
| 2010/0153833 A1* | 6/2010 | Siegel et al. | 715/205 |

* cited by examiner

*Primary Examiner*—Thien M Le
(74) *Attorney, Agent, or Firm*—American Patent Agency; Daniar Hussain

(57) ABSTRACT

The present invention relates to configuration of inspection systems and compliance verification systems using a handheld device and a remote database. Disclosed here is a method for configuring a project having one or more installation of assets for use with an industrial inspection compliance system, including the steps of (a) defining an installation and storage area for the project; (b) assigning the assets uniquely into the one or more installation or storage area; (c) segmenting each asset into components; (d) assigning logical inspection points for the project, installations, and the assets; (e) defining inspection criteria for each logical inspection point; (f) assigning tag locations for a machine-readable tag having a unique serial number at or near each logical inspection point; (g) capturing a media sample of each logical inspection point; (h) capturing location coordinates for each logical inspection point; and (i) requiring the collection of data such as a unique machine-readable tag serial number, media sample, location coordinates, and an encrypted security signature to confirm that the inspection actions actually occurred.

20 Claims, 16 Drawing Sheets

1000

SYSTEM AND METHOD USED FOR CONFIGURATION OF AN INSPECTION COMPLIANCE TOOL WITH MACHINE READABLE TAGS AND THEIR ASSOCIATIONS TO INSPECTED COMPONENTS

REFERENCE TO RELATED APPLICATIONS

This application is related to co-pending application Ser. No. 12/489,313, filed on Jun. 22, 2009, and entitled "A system and method for carrying out an inspection or maintenance operation with compliance tracking using a handheld device," application Ser. No. 12/507,039, filed on Jul. 21, 2009 and entitled "A system and method for cropping and annotating images on a touch sensitive display device," and application Ser. No. 12/507,071, filed on Jul. 22, 2009 and entitled "A system and method for generating quotations from a reference document on a touch sensitive display device," which all claim priority from provisional application Ser. No. 61/122,632, filed on Dec. 15, 2008, and entitled "A system, method and apparatus for inspections and compliance verification of industrial equipment using a handheld device," the entirety of which are all hereby incorporated by reference herein.

FIELD OF THE INVENTION

The present invention is generally related to inspection systems. More specifically, this invention relates to a system and method for configuring and installing an industrial inspection system assisted by a handheld device, which helps to ensure compliance of the safety and security of industrial equipment fit for business use. The present invention may be used to help prevent accidents that can happen during usage of such industrial equipment, as well as prevent negligent, missed or incomplete inspections of such industrial equipment.

BACKGROUND OF THE INVENTION

National U.S. statistics show that approximately 20% of accidents on construction sites involve cranes. "For the 11 years 1984-94, 502 deaths occurred in 479 incidents involving cranes in the construction industry" (Suruda, p. 4), which amounts to an average of 44 fatal crane accidents per year, with an average of one human life lost per crane accident. The number of crane-related deaths are on the rise since those statistics were compiled, due to a number of factors, including an increase in the number of construction projects, an increase in the size of the construction projects, and an increase in the System and method used for configuration of an inspection compliance tool with machine readable tags and their associations to inspected components economic pressures to complete construction projects on time and under budget, which have resulted in shortcuts many consider to be unsafe.

A rash of crane accidents is occurring around the country resulting in national and international news. Tight economic conditions and high energy prices have led to large numbers of large scale energy-related construction projects, such as the extension and building of new oil refineries. These construction projects are on extremely tight time and budget schedules because of the economic realities of high energy, and specifically petroleum, prices. The result has been an unprecedented number of deadly, costly, and highly publicized crane accidents.

For example, on Jun. 18, 2008, a crane accident at a Texas oil refinery killed four people and injured six others. The crane was not scheduled to be operated that day. On May 30, 2008, a crane accident in New York City killed two workers when the boom and cab snapped off the turntable and fell, apparently because of a bad weld in the rotating plate. Proper inspections were not carried out on the crane, and the New York City Buildings Department Head was fired by the Mayor over this and another preceding incident. On Mar. 25, 2008, a crane accident in Miami killed two workers in the fall of a 20-foot section that was being lifted to extend the height of the crane. The safety personnel who made the safety rules did not follow their own safety rules of evacuating the construction management office in the event of a pick. On Mar. 15, 2008, a second crane accident in New York City killed seven people when a piece of nylon webbing broke, dropping a six-ton metal collar that was being installed. It dislodged the collar below, disconnecting the crane from the building and allowing it to topple over onto a residential building. Proper inspections were not carried out on the crane, the construction site had numerous safety violations, and neighbors, residents, and passer-by's complained and lodged reports of unsafe activity and operation of the crane.

Many parties have sought unsuccessfully to prevent crane accidents, including OSHA, the construction industry, and various researchers. Strong heavy construction industry growth, especially in the oil, natural gas, and energy field, as a result of the high price of crude oil and energy, has resulted in the hiring of many workers, a large proportion of whom may be inadequately trained.

It is evident that many crane hazards go unnoticed or that efforts to prevent crane accidents are not effectively implemented. Crane hazards on sites should be detected through rigorous inspections of construction sites and eliminated through effective preventive approaches.

Traditional approaches that have provided crane safety equipment and proper training have not reduced the number of crane accidents. Traditional crane safety training is not sufficient to enable crane operators to detect and eliminate crane hazards.

Motivating crane operators, workers, independent contractors, management, and apparently safety officers themselves to fully follow all safety guidelines at all times is perhaps the greatest challenge.

Texas has led the nation with 26 crane-related fatalities in 2005 and 2006, according to federal statistics. Cranes in Texas operate without any state or local oversight.

Human lives are lost unnecessarily every year because recognized and known safety procedures are not followed, overlooked, or even ignored. Construction accidents are not only bad for worker morale, but they bring bad press and hinder worker recruitment. They are also huge financial and logistical liabilities. Even with safety programs in place, historical claims data indicates construction is a potentially highly risky venture financially, especially in large industrial projects. The cost of risk can be quantified—there has been a national average of 82 crane fatalities per year from 1997-2006 (Bureau of Labor Statistics), and an average of 1 crane fatality per $8 B of construction value (Construction Management Magazine). Direct & indirect accident costs averaged at 3.8% of construction value, which include workers' compensation payments, general liability, and litigation expenses (Business Roundtable). In addition, for every dollar of direct cost, there was $2.20 of indirect costs.

For example, Zachry Construction Company estimates that one day's delay in the construction of an oil refinery or power plant can cost Zachry over $300,000 in liquidated damages arising from guaranteed delivery contracts with the plant owners. A fatality, or any serious accident at a construction site, inevitably leads to delays of multiple days or even weeks, disrupting construction work, both for site clean-up, internal inspections, as well as OSHA inspections.

Some costs may have balance sheet implications, yet are hard to define, especially for large complex projects involving petroleum. The time required to replace mission critical infrastructure damaged in an accident is generally long. The environmental impact can be large as well. For example, the oil spill of the Exxon Valdez oil tanker in Alaska resulted in a judgment of $2.5 B. The loss of corporate reputation and goodwill, intangible and often unrecoverable assets, is substantial in the event of a crane accident.

Cranes are but one example of industrial equipment that is subject to inspection for compliance with safety or security standards. Other possible industrial equipment includes vehicles such as airplanes, buses, trains, subways, cars, ships, and trucks, public buildings, privately-owned buildings, residential homes, highways, train tracks, airport runways, ship harbors, bridges, underground tunnels, shelters, dams, conventional power plants, nuclear power plants, particle colliders, oil extraction sites, oil refineries, communication towers, data centers, sewage systems, water treatment plants, water wells, reservoirs, and any other equipment or the like.

Examples of inspections on industrial equipment other than cranes include the inspection of commercial airplanes with FAA (Federal Aviation Administration) standards, the inspection of communication towers with FCC (Federal Communications Commission) standards, the inspection of dams with state dam safety standards such as NJAC (New Jersey Administrative Code) 7:20, the inspection of nuclear power plants with IAEA (International Atomic Energy Agency) standards, and other similar inspections under various public safety standards. Other inspection compliance requirements are associated with renewable energy systems and distributed energy systems, including wind turbines, solar photovoltaic, solar thermal plants, co-generation plants, biomass-fueled power plants, carbon sequestration projects, enhanced oil recovery systems, and the like.

The present inventors have designed and patented an industrial inspection system. However, the industrial inspection system typically requires complicated and extended setup and configuration operation, including the installation and setups of hundreds, or thousands, or RFID tags, associated meta-data, associated reference documents, etc. Therefore, as recognized by the present inventors, a system, method and apparatus for setting up, installing, and configuring an industrial inspection system is highly desirable.

It is against this background that various embodiments of the present invention were developed.

BRIEF SUMMARY OF THE INVENTION

The present invention is a method and a system for setup, installation, and configuration of an industrial inspection system using a handheld device and remote database.

Accordingly, and according to one embodiment of the present invention, disclosed herein is a method for configuring a project having one or more installation of assets for use with an industrial inspection compliance system, including the steps of (a) defining an installation and storage area for the project; (b) assigning the assets uniquely into the one or more installation or storage area; (c) segmenting each asset into components; (d) assigning logical inspection points for the project, installations, and the assets; (e) defining inspection criteria according to one or more safety standards documents containing one or more safety code standards which the inspector can reference in justifying a violation or a work order to correct a violation; (f) assigning tag locations for a machine-readable tag having a unique serial number at or near each logical inspection point; (g) capturing a media sample of each logical inspection point; (h) capturing location coordinates for each logical inspection point; and (i) requiring the collection of data such as a unique machine-readable tag serial number, media sample, location coordinates, and an encrypted security signature to confirm that the inspection actions actually occurred, where the industrial inspection compliance system can annotate a media sample at the logical inspection points to indicate a safety violation according to one of the safety documents.

Another embodiment of the present invention involves entering unique asset information into a remote database.

Another embodiment of the present invention involves capturing a media sample to show a location of each machine readable tag; two-touch cropping each media sample to a desired size; and entering status information about the machine readable tag.

Another embodiment of the present invention involves assigning each machine readable tag a unique serial number into a remote database, and attaching the tags to each asset.

Another embodiment of the present invention involves selecting which components require inspection.

Another embodiment of the present invention involves creating an organization tree from the assets, and component information into a remote database.

Another embodiment of the present invention involves creating new data information from previous setup information, unique assets, non-unique assets, and components already created in the remote database.

Another embodiment of the present invention involves inputting a template containing required codes and other relevant information needed for compliant inspection report generation.

Another embodiment of the present invention involves defining one or more biometric signatures that must be satisfied by an inspector using the industrial inspection system to authenticate an authority and an experience level of the inspector. Examples of the biometric signature include handwritten signature, RFID swipe of card badge, photograph of inspector, and thumbprint.

Another embodiment of the present invention involves adding parts from a list of parts previously uploaded into the central database.

Another embodiment of the present invention retrieving one or more reference documents from the central database, selecting an excerpt from the reference documents, and inserting the excerpt into an inspection template.

Another embodiment of the present invention involves sending one or more alerts on selected criteria, including patterns of events having to do with inspectors, patterns of events having to do with assets, and patterns of events having to do with manufacturer's warranty.

Yet another embodiment of the present invention is a method for configuring a project for use with an industrial inspection compliance system, which includes the steps of defining one or more inspection criteria according to one or more safety standards documents for one or more logical inspection points of the project, wherein the safety standard documents contain one or more safety code standards which an inspector can reference in justifying a violation or a work order to correct the violation; and encapsulating a unique data object for at least one of the logical inspection points using a computer processor, each data object storing a unique machine-readable tag serial number, a media sample, and location coordinates of said logical inspection point, which the industrial inspection compliance system later uses to ensure compliance by ensuring actual visitation to said logical inspection point.

The present invention also includes a related system by which the method of setting up and configuring an industrial inspection system could be carried out. Such a system could be implemented as a computer system, embodied in a handheld device using separate unique machine-readable tags deployed throughout logical inspection points on a physical inspected component. The system may include integrated or separate hardware components for scanning of unique machine-readable tags and taking of media samples of inspected components.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The present invention is a method and a system for setup, installation, and configuration of an industrial inspection system using a handheld device.

The application of the present invention to Ser. No. 12/489, 313 is first described—that is, the industrial inspection system according to U.S. Ser. No. 12/489,313 is first described to give context to the system and method of installing and configuring it. The industrial inspection system is first described in relation to FIGS. 1-13. Then, the industrial inspection system configuration and installation procedure is described in relation to FIGS. 14-16, with proper reference to the system being installed referred back to FIGS. 1-13.

The industrial inspection system generally pertains to an industrial inspection compliance system with which various methods can be carried out to the effect of assisting in an inspection and providing the means for compliance verification of a proper inspection. For the purposes of the text describing this industrial inspection system, an inspection may represent the process of checking a physical component for safety, security or business reasons, doing the same for compliance with industry standards and guidelines, or a maintenance operation on a physical component for those same reasons. These methods can generally be best executed by a multi-function handheld device, carried to and used in the physical proximity of an inspected component by the inspector. Examples of multi-function handheld devices include the Apple iPhone®, the Psion Teklogix Workabout Pro®, the Motorola MC-75®, and the like, but the present industrial inspection system is not limited to such devices as shown or described here. One aspect of the industrial inspection system relates to scanning unique machine-readable tags deployed at logical inspection points defined by the inspector, and assigning a timestamp to the scanning operation. Another aspect of the industrial inspection system relates to taking media samples of logical inspection points defined by the inspector, and assigning a timestamp to the media sample capturing operation. Another aspect of the industrial inspection system relates to reporting of sub-optimal conditions of the unique machine-readable tags deployed at logical inspection points if its condition warrants such a declaration. Another aspect of the industrial inspection system relates to associating a media sample with a corresponding scan of a unique machine-readable tag. Another aspect of the industrial inspection system relates to annotating a media sample in such ways that substantiate statements of an industrial component passing inspection, or in such ways that substantiate statements of problems found with the industrial component.

Figure 1:
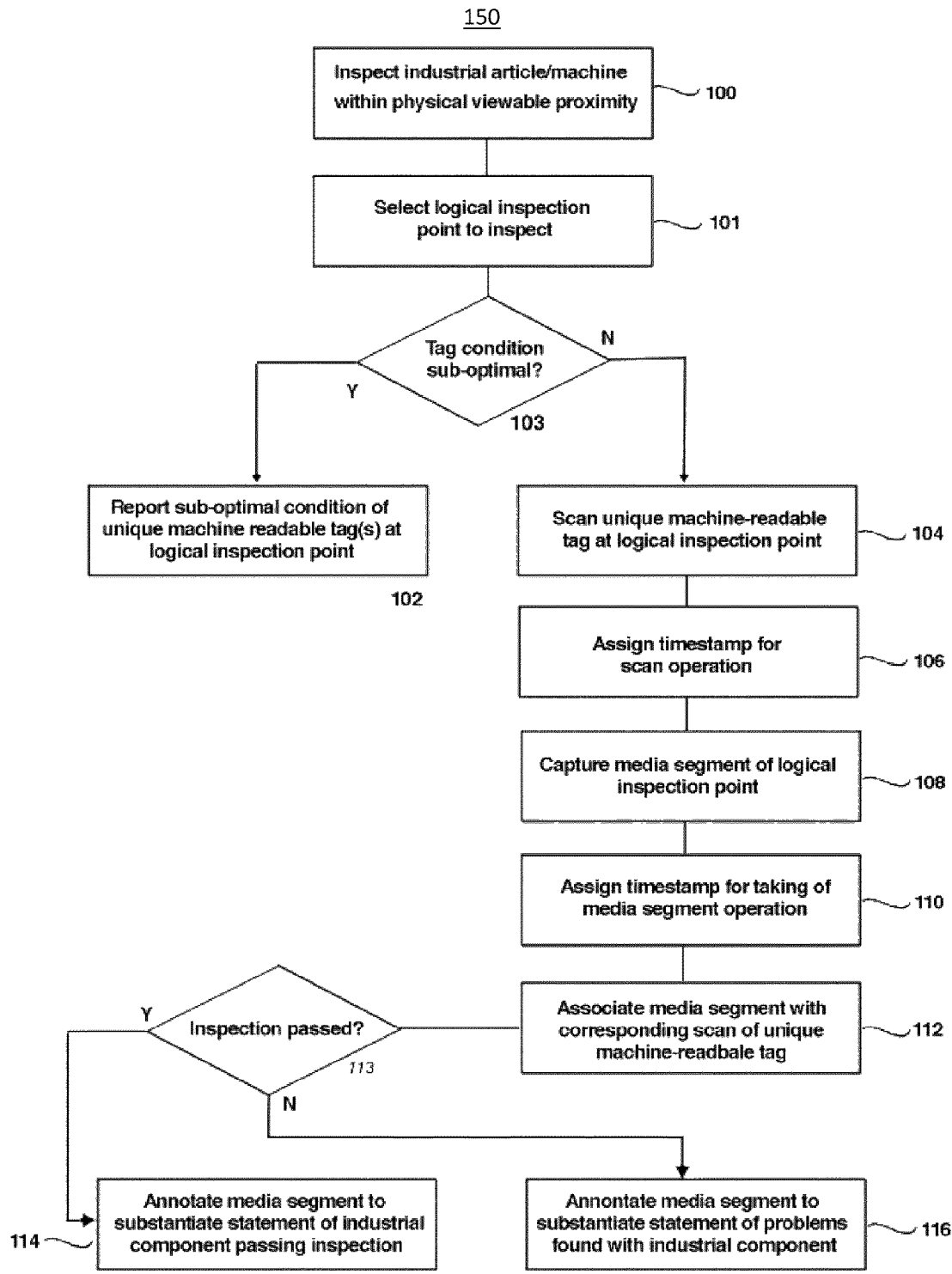
FIG. 1 is a flowchart of a method for ensuring compliance of industrial inspections, in accordance with one embodiment of the industrial inspection system.
Figure 2:
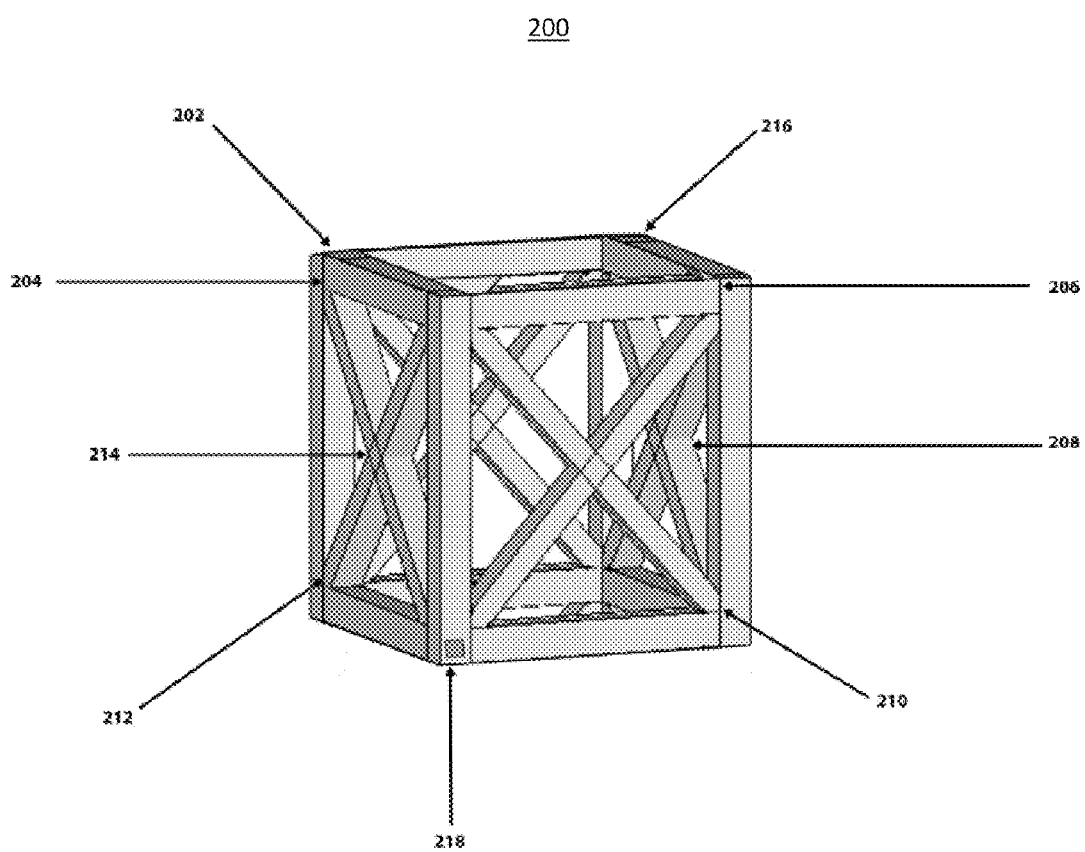
FIG. 2 is an illustration of an illustrative inspection component, the mast section of a tower crane, which is segmented into logical inspection points, in accordance with another embodiment of the industrial inspection system.

FIG. 1 is a flowchart diagram of a method 150 for ensuring compliance of industrial inspections, in accordance with one embodiment of the present industrial inspection system. This inspection method can generally be best executed by a multi-function handheld device, carried to and used in the physical proximity of an inspected component by the inspector. This method generally begins at block 100 where an inspector would inspect some industrial component within physical viewable proximity. The component mentioned may include an article or machine, or groups of articles or machines, which are marked to be inspected against prevailing safety or security standards. This embodiment of the industrial inspection system requires an inspector to be within physical viewable proximity from the inspected component in order to help ensure that the inspector has actually visited the component. This requirement may be enforced by the fact that the inspector will be unable to perform the operations on the handheld device to carry out this method if he is not within physical viewable proximity of the industrial component to be inspected. This method assumes that the physical component has already been logically separated into one or more logical inspection points as shown in FIG. 2, which will be described in more detail later. This method also assumes that the physical component has already been tagged with unique machine-readable tags at each logical inspection point.

Following block 100, industrial inspection method 150 proceeds to block 101 where the inspector selects a logical inspection point to begin inspection. This may be done on the device software by selecting from a list of physical components or from a list of logical inspection points, depending on how the inspector chose to configure the system. Alternatively, this may be done by scanning the unique machine-readable tag deployed at the logical inspection point to be selected, as in block 104.

Following block 101, industrial inspection method 150 proceeds to a decision block 103, where a decision is made if the unique machine-readable tag is in a "sub-optimal" condition (if it is not readable for whatever reason, it is considered to be in a sub-optimal condition). In the situation where the unique machine-readable tag deployed at the logical inspection point is found to be in sub-optimal condition, the industrial inspection method 150 proceeds to block 102, where the inspector may report the condition that justifies the sub-optimal condition. This reporting may be done in addition to or in lieu of scanning the machine-readable tag. A sub-optimal condition includes the condition of a tag being broken, the condition of a tag being unable to be scanned for any reason, the condition of a tag being absent for any reason, the condition of a tag being misplaced, or any other unacceptable condition or the like.

In the situation where the unique machine-readable tag deployed at the logical inspection point is not in a sub-optimal condition, industrial inspection method 150 proceeds to block 104 where an inspector scans the unique machine-readable tag deployed at the selected logical inspection point. A unique machine-readable tag may be a barcode sticker, a high-frequency (HF) radio-frequency identification (RFID) tag, an ultra-high-frequency (UHF) RFID tag, or any other tag or the like that serves as a unique identifier for a logical inspection point. The scanning of the tag may be done by a corresponding tag reader either embedded in the inspector's handheld device, or embodied in a separate dedicated device, implemented in whichever way is necessary to read the corresponding tag, whether by way of visual identification, radio frequency identification, or the like, and store a record of the scanning operation. Various other techniques of choosing the type of unique machine-readable tag and its scanning are within the skill of one of ordinary skill in the art.

Following block 104, industrial inspection method 150 proceeds to block 106, where a timestamp is assigned to the scanning operation of block 104. The timestamp may be expressed as a date and time pair, POSIX time, or any other representation that is semantically consistent between any other timestamp assignment made in the scope of this method. The general purpose of the timestamp assignment is to seal a record of the point in time at which the inspector executed an operation that is a critical component to the proof of inspection. This step is important to the goal of ensuring compliance of the industrial inspection process. Therefore, one of ordinary skill would appreciate that block 104 may not only consist of the action of timestamp assignment, but possibly also the action of timestamp verification, such as the employment and execution of a digitally-signed timestamp, or any other action of the like.

Following block 106, industrial inspection method 150 proceeds to block 108 where an inspector takes a media sample of the selected logical inspection point. A media sample is defined to be a photograph, a sequence of photographs, an ultrasonic image, an infrared image, any other type of mechanically, chemically or electromagnetically-obtained image, a video with an audio component, a video without an audio component, or any other visual or set of visual media or the like. The taking of a media sample may be done by a media input component either embedded in the inspector's handheld device, or embodied in a separate dedicated device, implemented in whichever way is necessary to take and store the media sample.

Following block 108, industrial inspection method 150 proceeds to block 110 where a timestamp is assigned to the media sample taking operation of block 108. The timestamp assignment in block 110 is of the same spirit and scope as the timestamp assignment described in block 106.

Following block 110, industrial inspection method 150 proceeds to block 112 where the media sample taken in block 108 is associated with a scanning of a unique machine-readable tag in block 104. This association may take the form of a database join table in which ID's of media samples are paired with ID's of unique machine-readable tags, with the ID's having already been established during the operations of scanning the unique machine-readable tag and taking the media sample. For example, an inspector may scan RFID (the unique machine-readable tag) tag number 0039850921847576, the operation of which is recorded by his handheld device software in a database table called "TagScans" that has a primary key called "id" and assigns this record an "id" of 3. Then the inspector learns from the device software that the RFID he just scanned is referring to a particular joint of the mast section of the tower crane he is inspecting, a logical inspection point he had segmented previously. He then takes a photograph (the media sample) of the vicinity of the RFID tag he just scanned, making sure to capture a good shot of the joint, which is the logical inspection point he intends to inspect. After taking the photograph, the handheld device software first records the photographing operation in a database table called "PhotoCaptures" that has a primary key called "id" and assigns this record an "id" of 8. Then it associates the two records just created from the RFID scanning and photographing operations by creating a new record in a database join table called "TagScansAndPhotoCaptures" with the following (TagScanId, PhotoCaptureId) pair: (3, 8). The tag scan and media sample are now logically associated, according to one embodiment of the present industrial inspection system.

Following block 112, industrial inspection method 150 proceeds to decision block 113, where a determination is made by the inspector if the logical inspection point successfully passes the criteria established for the inspection. In the situation in which the logical inspection point passes the inspection, the industrial inspection method 150 proceeds to block 114 where an inspector annotates the media sample taken in block 108 in such ways as to substantiate his statement of the logical inspection point passing inspection. When an inspector allows a logical inspection point to pass inspection, he is making a serious statement about the integrity of the physical component in the face of safety or security standards. Therefore, the step described in block 114 provides the means by which the inspector may add supportive marks, indications, statements, or other data or metadata or the like that serve to justify his statement of the logical inspection point passing inspection.

In the situation in which the logical inspection point does not pass the inspection, industrial inspection method 150 may possibly proceed to block 116 where an inspector annotates the media sample taken in block 108 in such ways as to substantiate his statement of problems found with the logical inspection point. A useful inspection will need to indicate how the physical component is faulty, what codes in which standards that the fault violates if there exists any applicable code or standard, what should be done to remedy the fault, or any other supportive material or the like. Therefore, the step described in block 116 provides the means by which the inspector may add supportive marks, indications, statements, or other data or metadata or the like that serve to justify his statement of problems found with the logical inspection point.

The process of annotating a media sample as described in block 114 and 116 includes any step that helps to substantiate a conclusive statement made by the inspector about a physical inspected component. The conclusive statement generally refers to either a statement of an industrial component passing inspection as in block 114 or a statement of problems found with an industrial component as in block 116, but may include any other conceivable conclusive statement or the like. For example, if the media sample taken is a photograph of a joint in the mast section of a tower crane and the inspector determines that the joint is not properly welded, the photograph is then annotated by the inspector to visually show the location of the improper welding. In this case, the inspector uses the touch screen capabilities of the handheld device and the capabilities of the software to draw a red circle on the digital photograph he took, encircling the segment of the photograph in which the improperly-welded joint is visible. One of ordinary skill would appreciate that drawing a red circle on a photograph is but one of many possible ways to annotate a media sample. Other methods include highlighting a segment of a photograph with a bright color such as done in the physical analogue of using a highlighter pen, creating and populating a free-form text field with a connected pointer line superimposed on a photograph and pointing to a specific point on the photograph, drawing a thick black border around the form of an object identified in an infrared image, making the same such annotations on a series of video stills all belonging to the same video sequence, superimposing text on a set of video stills to effectively subtitle a video, or any other method of media sample annotation or the like.

FIG. 2 is an illustration of an illustrative inspection component, the mast section of a tower crane 200, which is segmented into logical inspection points, in accordance with another embodiment of the present industrial inspection system. The diagram serves as an example of a possible industrial component that must be inspected against safety or security standards, such as those of ASME (American Society of Mechanical Engineers). Items 202, 204, 206, 208, 210, 212, 214 and 216 are welded joints on this tower crane mast section, which in this case are the logical inspection points for this physical inspected component. A logical inspection point may include any physical sub-component of any physical inspected component of the article or machine to be inspected, even of the physical article/machine itself, or any non-physical aspect of inspection that can somehow be mapped to a physical component or sub-component of the inspected article/machine. Logical inspection points may be defined by the inspector before or during an inspection, whereby each physical article or machine that is to be inspected has at least one logical inspection point. For example, if the tower crane mast section 200 is to be considered the inspected physical article, the inspector may choose to define each of the eight welded joints 202, 204, 206, 208, 210, 212, 214 and 216 as logical inspection points. In this case, each of those items refers directly to a physical weld job that needs to be inspected. Each logical inspection point will have one or more associated unique machine readable tags, such as RFID tag 218. For simplicity of illustration, only one unique machine readable tag 218 is shown, even though each logical inspection point may have one or more unique machine readable tags associated with it. Non-physical logical inspection points for mast section 200 may include requiring that joints 202, 204, 206 and 216 have the same horizontal height in order to maintain balance, requiring that those same joints form a near-perfect square in a top-down view, or any other inspection goals or the like.

Figure 3:
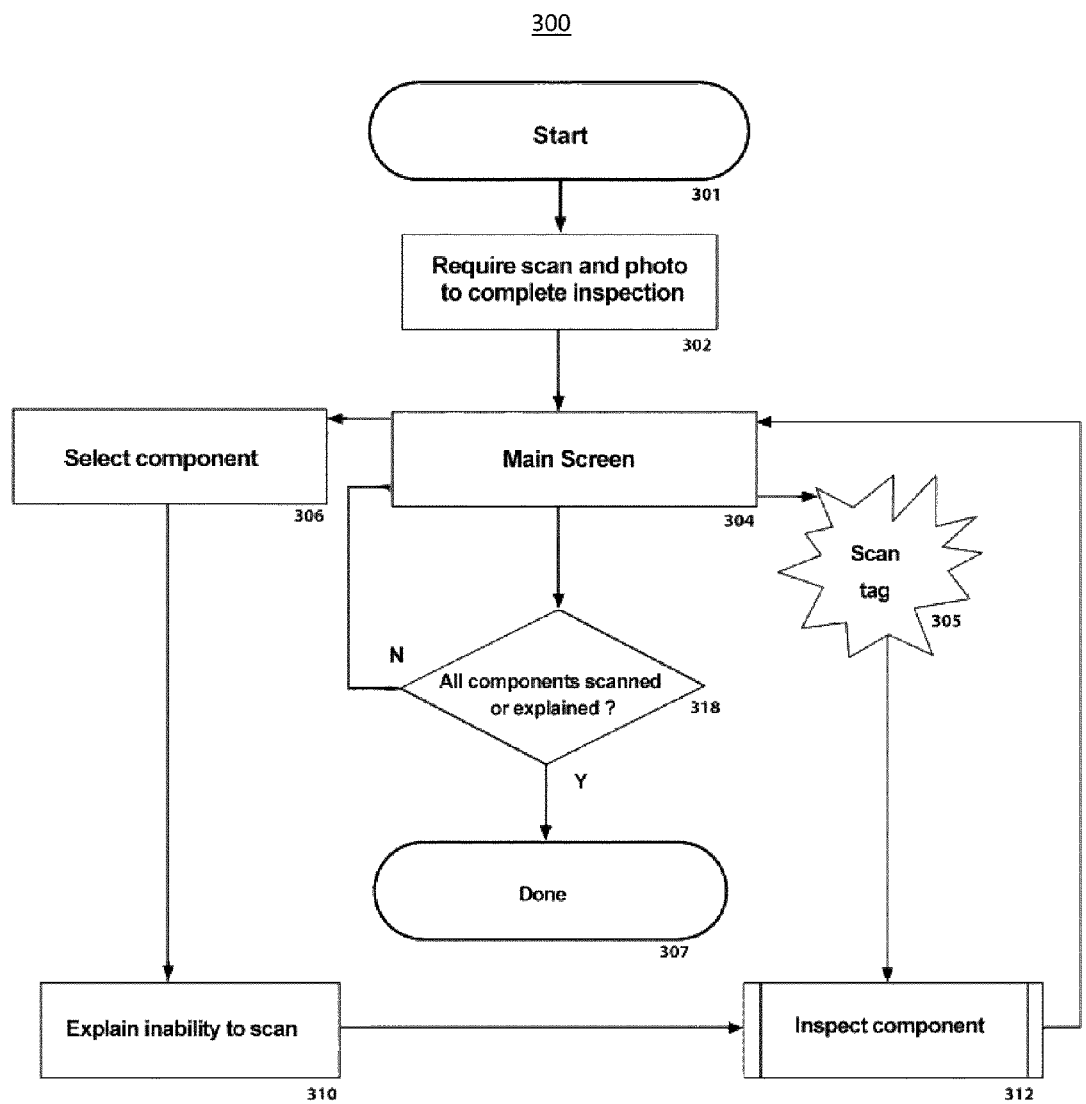
FIG. 3 is a flowchart of a method of ensuring compliance of industrial inspections, detailing the flow of usage of the software on a handheld device, in accordance with yet another embodiment of the present industrial inspection system.

FIG. 3 is a flowchart of a method 300 of ensuring compliance of industrial inspections, detailing the flow of usage of the software on a handheld device, in accordance with yet another embodiment of the present industrial inspection system. This inspection software can generally be best executed by a multi-function handheld device, carried to and used in the physical proximity of an inspected component by the inspector. This method generally begins at block 301, where an inspector would begin inspection of some industrial component within physical viewable proximity. Block 302 designates the fact that the industrial inspection cannot be completed unless the required scanning of each machine readable tag and an associated media sample capture operation are properly performed, or a properly documented reason is provided providing an explanation as to why a particular operation was skipped.

Following block 302, industrial inspection method 300 proceeds to block 304 where the main screen of the handheld device software is presented to the inspector. This screen may contain buttons, text links or any other objects that allow the inspector to proceed with any aspect of the inspection.

Following block 304, a selection is made by the inspector from the main screen of the handheld device. An inspector may select a component for inspection from a drop-down menu, a list, or the like, in which case industrial inspection method 300 proceeds to block 306 (described below). An inspector may indicate that the inspection is complete, in which case industrial inspection method 300 proceeds to block 318 (described below). Alternatively, an inspector may simply scan a unique machine-readable tag, in which case industrial inspection method 300 proceeds to block 305 (described below).

If industrial inspection method 300 proceeds to block 306, the inspector chooses a general component to be inspected from a list of components presented to him by the software. These general components may either be whole physical articles or machines to be inspected, physical sections of the article/machine, or logical inspection points as described before. The list of components is generally prepared by the inspector before the inspection, but the software may allow the inspector to add new components during the inspection if there is a need to do so. Any functions having to do with on-the-spot component configuration, segmentation of physical inspected components into logical inspection points, selection of inspected component, or any other functions or the like, are within scope of block 306.

Following block 306, industrial inspection method 300 proceeds to block 310 where the inspector explains the inability to scan a unique machine-readable tag whose identification refers to the component. Since the spirit of this industrial inspection system pertains to compliance of inspection of industrial equipment, and since the inspector is able to select a component from a list of components in block 306, therefore bypassing the need to be in physical proximity of the inspected component, the inspector should be prompted to provide and record an acceptable reason as to why he cannot scan a tag. Block 310 represents a step in the inspection process that forces the inspector to explain why he is unable to scan a tag that is deployed at an inspection point for the purpose of ensuring that he is within physical proximity to the inspected component. Possible reasons may include the condition of a tag being broken, the condition of a tag being unable to be scanned for any reason, the condition of a tag being absent for any reason, the condition of a tag being misplaced, or any other unacceptable condition or the like.

If industrial inspection method 300 proceeds to block 305, the inspector scans a unique machine-readable tag deployed at the selected logical inspection point. A unique machine-readable tag may be a barcode sticker, a high-frequency (HF) radio-frequency identification (RFID) tag, an ultra-high-frequency (UHF) RFID tag, or any other tag or the like that serves as a unique identifier for a logical inspection point. The scanning of the tag may be done by a corresponding tag reader either embedded in the inspector's handheld device, or embodied in a separate dedicated device, implemented in whichever way is necessary to read the corresponding tag, whether by way of visual identification, radio frequency identification, or the like, and store a record of the scanning operation. Various other techniques of choosing the type of unique machine-readable tag and the scanning of it are within the skill of one of ordinary skill in the art. The software then recognizes the scanned tag's unique identifier and proceeds to retrieve all of its associated data and begins the inspection process for the logical inspection point associated with that particular tag.

Following either block 305 or block 310, industrial inspection method 300 checks whether or not the selected component has already been inspected. At this point, the process of selecting an inspection component or a logical inspection point, either by way of manual selection on the handheld device software or by scanning a unique machine-readable tag that the software maps to a particular logical inspection point, is assumed to have already been completed. The next screen presented to the inspector by the software is determined by whether or not the selection has already been inspected.

If a determination is made that the selected component has not been inspected, industrial inspection method 300 proceeds to block 312, where the software guides the inspector to initiate the process of inspecting the selected component. The inspection process itself involves one or more iterations of taking a media sample, as described in relation to block 108 of FIG. 1, associating the media sample with a corresponding scan of a unique machine-readable tag or of a logical inspection point in the system as described in relation to block 112 of FIG. 1, and editing the media sample as described above. Editing the media sample includes the actions of cropping the media sample, making annotations on the media sample as described in relation to blocks 114 and 116 of FIG. 1, or any other action that can be done on a media sample or the like.

In block 312, after the inspector takes the media sample and edits it as described above, the software presents the component inspection screen to the inspector. From this screen the inspector may choose to continue inspection of the same component, which may include such actions as typing in notes, speaking into an audio input device if one is available and is able to be interpreted and stored by the software, taking another media sample, or take another inspection action.

In block 312, industrial inspection method 300 may allow the inspector to add a quotation from some standards or specifications document, such as those of ASME (American Society of Mechanical Engineers). The software will present the inspector with an interface for navigating a document, on which he may carry out document navigation and selection actions such as capturing a screenshot of a section of the document, cropping the screenshot, annotating the screenshot, selecting text, selecting a page, or any other action or the like.

In block 312, industrial inspection method 300 may allow the inspector to insert any text selection, screenshot, link, reference of any sort, and the like, into any aspect of the inspection data that is associated with the particular inspected component or logical inspection point chosen in the particular iteration of block 312. For example, if the inspector is currently inspecting a welded joint of a tower crane mast section and he finds that the welding job is not done properly, not compliant with the ASME B 30.5 standard, then in carrying out the action of block 312, the inspector can navigate the ASME standard document to section B 30.5 and take a screenshot of the text of that particular section. He can then draw a red line underneath the sentences that describe the standard for a joint welding job that this particular joint does not comply with. Then, he may crop the screenshot such as to capture only the sentences he just underlined and then press a button on the handheld device to insert this cropped screenshot as an attachment to his inspection data for the joint of the tower crane mast section.

In addition to allowing an inspector to select an item from a pre-populated checklist, which requires the inspector to go through each item on the checklist, in one embodiment of the present industrial inspection system, the inspector can also make a free-form observation of a potential problem identified in the course of the inspection that may not be on the pre-populated checklist. If an inspector makes an observation of a potential problem during an inspection, whether from a pre-populated list or in free-form, the problem is logged by the inspection compliance system so that any future visits to the same site require the problem(s) noted in the previous inspection visit to be re-visited before the next inspection can be satisfactorily completed. Problems must be re-visited on subsequent inspections until they are fixed; re-visiting the problem means visiting the area where the problem was observed (and possibly swiping the machine readable tags), possibly noting any changes (taking new pictures, notes, etc. to describe changes), and optionally fixing the problems and recording pictures, notes, and the like of the fix. Problems will only be automatically populated into subsequent inspections until they are fixed.

In addition to allowing the inspector to perform an inspection, one embodiment of the present industrial inspection system also allows the inspector to immediately offer to fix the problem (e.g., repair the welding of a section of the crane mast), and to automatically generate a bill to the customer for fixing the problem. One embodiment of the present industrial inspection system allows the inspector to automatically generate, using the handheld device, a work items order for billing and accounting purposes, allowing the inspector to carry out the corrective measure immediately onsite without returning to the central office to generate a new work order. The work items order includes a list of the steps taken to fix each problem; a line item for each charge associated with fixing each problem; and a picture taken before and/or after the job is complete. The customer may then immediately review the work items order onsite, sign the inspection report and the work items order, and pay for both the inspection and the charges associated with fixing the problems with the industrial equipment, all before the inspector leaves the site.

Importantly, according to one embodiment of the present industrial inspection system, the data associated with each inspection is stored and versioned in a manner analogous to versioning of source code. A virtual industrial equipment, and all of its subcomponent(s), is versioned for each inspection, in such a way as to ensure that the right information for each version of the industrial equipment and all of its subcomponent(s) is always associated with the correct inspection report. This also adds an additional layer of accountability, as it is known at all times where, when, and by whom each observation and change to the equipment was made over all time. In order to reduce space consumption on the hand-held device, only the current version of the item(s) being inspected are stored in the handheld device, in addition to any prior versions of the item(s) that are referenced by the current version; that is, only the "shallowest closure component" of the entire version tree is stored locally on the handheld device. That is, the "shallowest closure component" is the minimum set of versioned data necessary to fully represent the components in question in their latest state, including whichever earlier versions are referenced by the current state.

Returning to FIG. 3, if a determination is made that the selected component has already been inspected, industrial inspection method 300 guides the inspector to a component inspection screen that shows filled-in data fields of the inspection, or may contain buttons, links or other objects that allow the inspector to navigate through his previous inspection. At this point, the software may or may not allow the inspector to edit or continue his previous inspection of the selected component.

Following block 312, industrial inspection method 300 proceeds back to block 304, representing the main screen, where the process continues as described above.

If the inspector indicates that he has completed the inspection, industrial inspection method 300 proceeds to block 318, where the software checks that all components marked to be inspected have gone through the required inspection procedure. If a component has not gone through the inspection procedure, the software will check that the inspector has provided an explanation in lieu of the inspection procedure, a declaration of a missing component, or has provided a reason as to why he did not carry out the inspection procedure.

Following block 318, if a determination is made that the inspector has not fulfilled the requirements checked in block 318, industrial inspection method 300 proceeds back to block 304, representing the main screen, where the inspector is instructed to complete the inspection of the missing component(s) or to provide a justification why the missing component(s) cannot or will not be inspected. In this manner, the inspector is given a chance to inspect missed components or edit already-inspected components.

Following block 318, industrial inspection method 300 proceeds to block 307, where the industrial inspection method 300 allows the inspection to end, since the software has determined that the inspection process is complete because of the fulfillment of all requirements checked by the software in block 318. If the inspection requirements have not been completely fulfilled as determined in block 318, the software should preferably not allow the inspector to proceed to block 307 and end the inspection, since this would be inconsistent with ensuring complete compliance with the industrial inspection process.

In one embodiment of the present industrial inspection system, not shown in FIG. 3, the industrial inspection method 300 includes an additional step of storing all versions of all components that have ever been inspected by the system. In one embodiment of the present industrial inspection system, not shown in FIG. 3, the industrial inspection method 300 includes an additional step of associating with the media sample and the scan of the unique machine-readable tag a unique user-identification of an inspector performing the inspection. In one embodiment of the present industrial inspection system, not shown in FIG. 3, the industrial inspection method 300 includes an additional step of substantiating inspector statements of problems with inspected components by quoting standards from a standards document.

In one embodiment of the present industrial inspection system, not shown in FIG. 3, the industrial inspection method 300 includes an additional step of generating a new work order item for any logical inspection point having a problem found during inspection. In one embodiment of the present industrial inspection system, not shown in FIG. 3, the industrial inspection method 300 includes an additional step of generating a problem reminder that requires an inspector to revisit any problem found during an inspection in a future inspection until the problem is fixed.

In one embodiment of the present industrial inspection system, not shown in FIG. 3, the industrial inspection method 300 includes an additional step of associating with the media sample and the scan of the unique machine-readable tag a location coordinate, such as global positioning system (GPS) coordinates, cell phone tower triangulation coordinates, and the like. In one embodiment of the present industrial inspection system, not shown in FIG. 3, the industrial inspection method 300 includes an additional step of associating with the media sample and the scan of the unique machine-readable tag a unique user-identification of an inspector performing the inspection.

Figure 4:
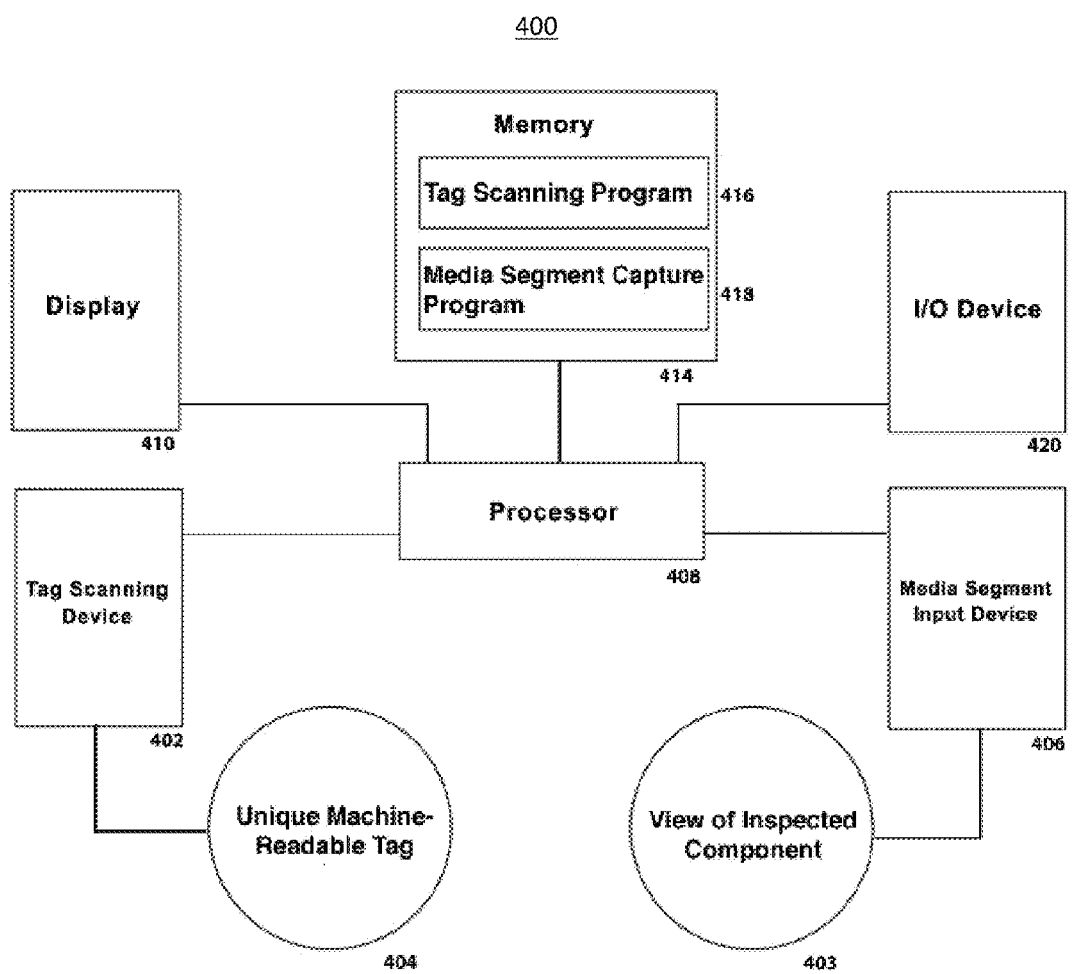
FIG. 4 is a block diagram of a system, in accordance with yet another embodiment of the present industrial inspection system.

FIG. 4 is a block diagram of an exemplary computer system 400, in accordance with one embodiment of the present industrial inspection system. The computer system 400 may correspond to a personal computer system, such as a desktops, laptops, tablets or handheld computer. The computer system may also correspond to a computing device, such as a cell phone, PDA, dedicated media player, consumer electronic device, and the like.

The exemplary computer system 400 shown in FIG. 4 includes a processor 408 configured to execute instructions and to carry out operations associated with the computer system 400. For example, using instructions retrieved from memory 414, the processor 408 may control the reception and manipulation of input and output data between components of the computing system 400. The processor 408 can be implemented on a single-chip, multiple chips, or multiple electrical components. For example, various architectures can be used for the processor 408, including dedicated or embedded processor, single purpose processor, controller, ASIC, and so forth.

In most cases, the processor 408 together with an operating system operates to execute computer code and produce and use data. Operating systems are generally well known and will not be described in greater detail. By way of example, the operating system may correspond to OS/2, Apple OS/X, Apple iPhone® OS, Google Android® OS, DOS, UNIX, Linux, Palm® OS, Windows, Windows Mobile®, Windows CE®, and the like. The operating system can also be a special purpose operating system, such as may be used for limited purpose appliance-type computing devices. The operating system, other computer code and data may reside within a memory block 414 that is operatively coupled to the processor 408. Memory block 414 generally provides a place to store computer code and data that are used by the computer system 400. By way of example, the memory block 414 may include Read-Only Memory (ROM), Random-Access Memory (RAM), hard disk drive, and the like. The information could also reside on a removable storage medium and loaded or installed onto the computer system 400 when needed. Removable storage mediums include, for example, CD-ROM, PC-CARD, memory card, floppy disk, magnetic tape, and a network component.

The computer system 400 also includes a display device 410 that is operatively coupled to the processor 408. The display device 410 may be a liquid crystal display (LCD) (e.g., active matrix, passive matrix and the like). Alternatively, the display device 410 may be a monitor such as a monochrome display, color graphics adapter (CGA) display, enhanced graphics adapter (EGA) display, variable-graphics-array (VGA) display, super VGA display, cathode ray tube (CRT), and the like. The display device may also correspond to a plasma display or a display implemented with electronic inks.

The display device 410 is generally configured to display a graphical user interface (GUI) that provides an easy-to-use interface between a user of the computer system and the operating system or application running thereon. Generally speaking, the GUI represents programs, files and operational options with graphical images. The graphical images may include windows, fields, dialog boxes, menus, icons, buttons, cursors, scroll bars, etc. Such images may be arranged in predefined layouts, or may be created dynamically to serve the specific actions being taken by a user. During operation, the user can select and activate various graphical images in order to initiate functions and tasks associated therewith. By way of example, a user may select a button that opens, closes, minimizes, or maximizes a window, or an icon that launches a particular program. The GUI can additionally or alternatively display information, such as non interactive text and graphics, for the user on the display device 410.

The computer system 400 also includes a tag scanning input device 402 that is operatively coupled to the processor 408. The tag scanning input device 402 is configured to transfer data from the outside world into the computer system 400. The input device 402 is used to scan unique machine-readable tag 404. The unique machine-readable tag 404 may be a barcode sticker, a high-frequency (HF) radio-frequency identification (RFID) tag, an ultra-high-frequency (UHF) RFID tag, or any other tag or the like that serves as a unique identifier for a logical inspection point. The scanning of the tag may be done by a corresponding tag scanning input device 402 either embedded in the inspector's handheld device, or embodied in a separate dedicated device, implemented in whichever way is necessary to read the corresponding tag, whether by way of visual identification, radio frequency identification, or the like, and store a record of the scanning operation. Various other techniques of choosing the type of unique machine-readable tag and the scanning of it are within the skill of one of ordinary skill in the art.

The computer system 400 also includes a media sample input device 406 that is operatively coupled to the processor 408. The media sample input device 406 is configured to transfer data from the outside world into the computer system 400. The input device 406 is used to capture a media sample and may include cameras of any sort, video camcorders with audio input, video camcorders without audio input, infrared imagers, ultrasonic imagers, or any other type of mechanical, chemical or electromagnetic imager that can obtain visual media. This visual media could be a view of an inspected component 403. The taking of a media sample may be done by media sample input device 406 either embedded in the inspector's handheld device, or embodied in a separate dedicated device, implemented in whichever way is necessary to take and store the media sample.

The computer system 400 also includes capabilities for coupling to one or more I/O devices 420. By way of example, the I/O devices 420 may correspond to keyboards, printers, scanners, cameras, speakers, and the like. The I/O devices 420 may be integrated with the computer system 400 or they may be separate components (e.g. peripheral devices). In some cases, the I/O devices 420 may be connected to the computer system 400 through wired connections (e.g. cables/ports). In other cases, the I/O devices 420 may be connected to the computer system 400 through wireless connections. By way of example, the data link may correspond to PS/2, USB, IR, RF, Bluetooth and the like.

The memory block 414 may include a tag scanning operational program 416, which may be part of the operating system or a separate application. The tag scanning operational program 416 generally includes a set of instructions that recognizes the occurrence of a tag scan operation on unique machine-readable tag 404 and informs one or more software agents of the presence of unique machine-readable tag 404 and/or what action(s) to take in response to the unique machine-readable tag 404.

The memory block 414 may also include a media sample capturing program 418, which may be part of the operating system or a separate application. The media sample capturing program 418 generally includes a set of instructions that recognizes the occurrence of a media sample capture operation of a view of inspected component 403 and informs one or more software agents of media obtained and/or what action(s) to take in response to the media obtained.

Not shown in FIG. 4, in one embodiment, the system 400 may also include a data storage area for storing all versions of all components that have ever been inspected by the system. Not shown in FIG. 4, in one embodiment, the system 400 may also have a data storage area for associating with the media sample and the scan of the unique machine-readable tag a unique user-identification of an inspector performing the inspection.

Not shown in FIG. 4, in one embodiment, the system 400 may also allow the inspector to declare sub-optimal conditions of the unique machine-readable tags at each logical inspection point, substantiated by corresponding media samples, if condition warrants such declaration. Not shown in FIG. 4, in one embodiment, the system 400 may also allow the inspector to annotate the media samples in such ways that substantiate inspector statements of problems with inspected components found during inspection. Not shown in FIG. 4, in one embodiment, the system 400 may also allow the inspector to substantiate inspector statements of problems with inspected components by quoting standards from a standards document.

Not shown in FIG. 4, in one embodiment, the system 400 may also allow the inspector to generate a new work order item for any logical inspection point having a problem found during inspection. Not shown in FIG. 4, in one embodiment, the system 400 may also allow an inspector to generate a problem reminder that requires the inspector to revisit any problem found during an inspection in a future inspection until the problem is fixed. Not shown in FIG. 4, in one embodiment, the system 400 may also allow the inspector to annotate the media samples in such ways that substantiate inspector statements of any inspected components passing inspection.

Not shown in FIG. 4, in one embodiment, the system 400 may also allow the inspector to associate with the media sample and the scan of the unique machine-readable tag a location coordinate, such as global positioning system (GPS) coordinates, cell phone tower triangulation coordinates, and the like, via an associated GPS device (not shown). Not shown in FIG. 4, in one embodiment, the system 400 may also allow the inspector to associate with the media sample and the scan of the unique machine-readable tag a unique user-identification of the inspector performing the inspection.

Figure 5:
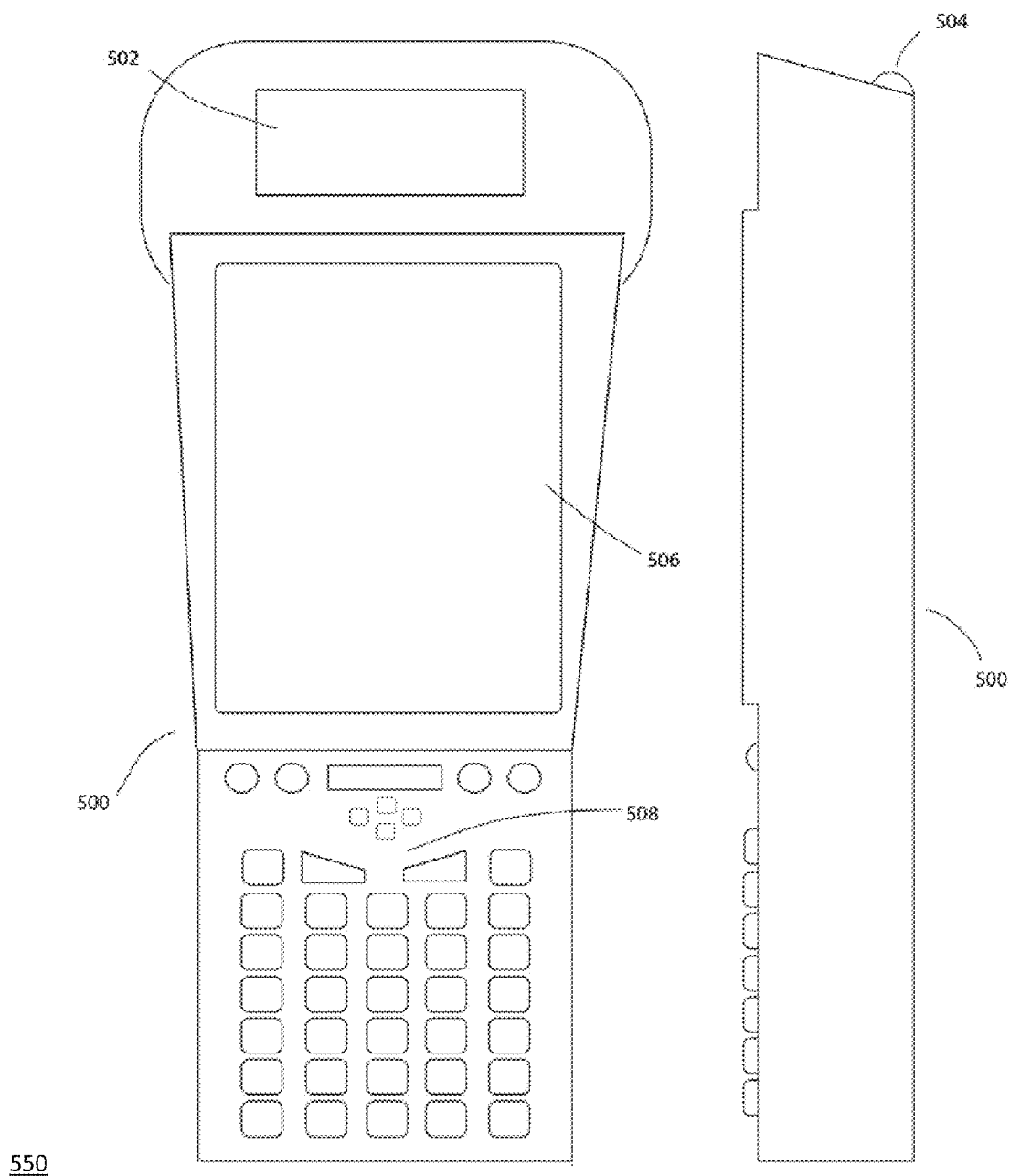
FIG. 5 is an illustration of a multi-functional handheld device, in which some of the software and hardware components of the system reside, in accordance with yet another embodiment of the present industrial inspection system.

FIG. 5 is an illustration 550 of a multi-functional handheld device 500, in which some of the software and hardware components of the system reside, in accordance with yet another embodiment of the present industrial inspection system. The handheld device 500 has a built-in display device 506, which corresponds to the display device 410 described in FIG. 4. The handheld device 500 also has a keyboard 508, which corresponds to I/O device 420 described in FIG. 4. The handheld device 500 also has an RFID scanner 502, which corresponds to the tag scanning input device 402 described in FIG. 4. Lastly, the handheld device 500 has a digital camera 504, which corresponds to the media sample input device 406 described in FIG. 4. The handheld device 500 presented is but one of many possible illustrative embodiments of the handheld device of the present industrial inspection system. One of ordinary skill in the art would appreciate that any other configuration of components that make up the handheld device 500, as well as any possible extensions by other hardware components, are all within the spirit and scope of the present industrial inspection system.

Figure 6:
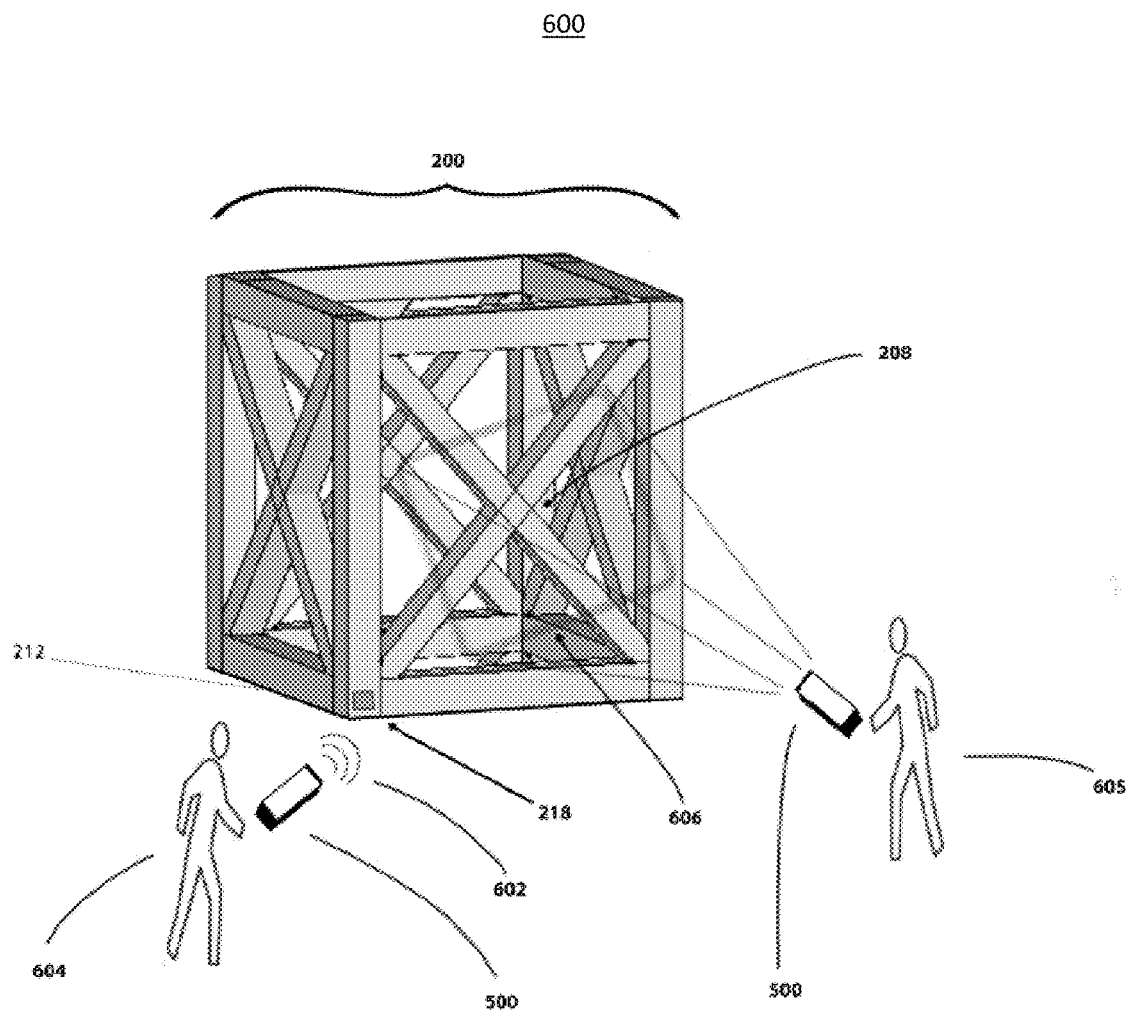
FIG. 6 is an illustration of inspectors in physical proximity to an inspection component, carrying out an inspection with handheld devices, in accordance with yet another embodiment of the present industrial inspection system.

FIG. 6 is an illustration of inspectors in physical proximity to an inspection component 200, carrying out an inspection with handheld devices, in accordance with yet another embodiment of the present industrial inspection system. The inspectors 604 and 605 are standing around article 200, which in this case is the mast section of a tower crane as shown earlier in FIG. 2. Inspector 604 is in the process of inspecting the welding of joint 212 of the mast section, while inspector 605 is in the process of inspecting the welding of joint 208 of the mast section. They are both using industrial inspection handheld device 500, as presented in detail in FIG. 5.

Inspector 604 is more specifically in the process of using industrial inspection handheld device 500, even more specifically embedded RFID reader 502, to scan RFID tag 218 via radio frequency communication channel 602. Since inspector 604 is within proximity of the inspected component, the welding of joint 212, which also serves as a logical inspection point for this inspection, he is able to successfully scan the RFID tag 218 because it is within the range of radio frequency communication channel 602.

Inspector 605 is more specifically in the process of using industrial inspection handheld device 500, even more specifically embedded digital camera 504 of FIG. 5, to take a photograph of a view 606 of welded joint 208 of tower crane mast section 200. Welded joint 208 in this case plays the role of both the inspected component and the logical inspection point.

The diagram of the inspection system shown in FIG. 6 is but one of many possible illustrative embodiments of the usage of the present industrial inspection system. One of ordinary skill in the art would appreciate that any other configuration, and representation thereof, of a similar system in use, as well as any possible extensions to the system, are all within the spirit and scope of the present industrial inspection system.

Figure 7:
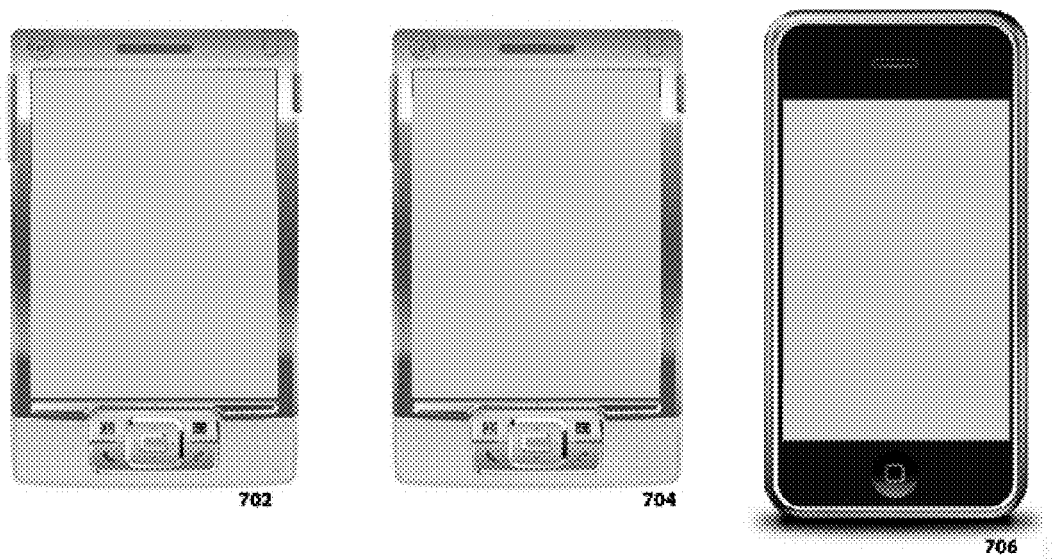
FIG. 7 is a set of diagrams of illustrative user interfaces in an inspection system installed on different handheld devices, in accordance with multiple embodiments of the present industrial inspection system.

FIG. 7 is a set of diagrams 700 of illustrative user interfaces in an inspection system installed on different handheld devices, in accordance with multiple embodiments of the present industrial inspection system. User interfaces 702, 704 and 706 represent three possible embodiments of a user interface deployed on handheld devices for taking a media sample and editing it. User interfaces 702 and 704 are deployed on a Windows Mobile® device while user interface 706 is deployed on an Apple iPhone®. User interface 702 represents one possible UI design in which tabularized pages allow the inspector to jump between sequential stages of the inspection process. User interfaces 704 and 706 both represent a possible UI design in which the inspector is presented with iconographic buttons corresponding to the process steps of taking a media sample and editing it. The diagrams presented in FIG. 7 are but some of many possible illustrative embodiments of the present industrial inspection system. One of ordinary skill in the art would appreciate that any other configuration of objects in a user interface, on any other handheld device, as well as any possible extensions to the set of functions presented in the user interfaces of FIG. 7, are all within the spirit and scope of the present industrial inspection system.

Figure 8:
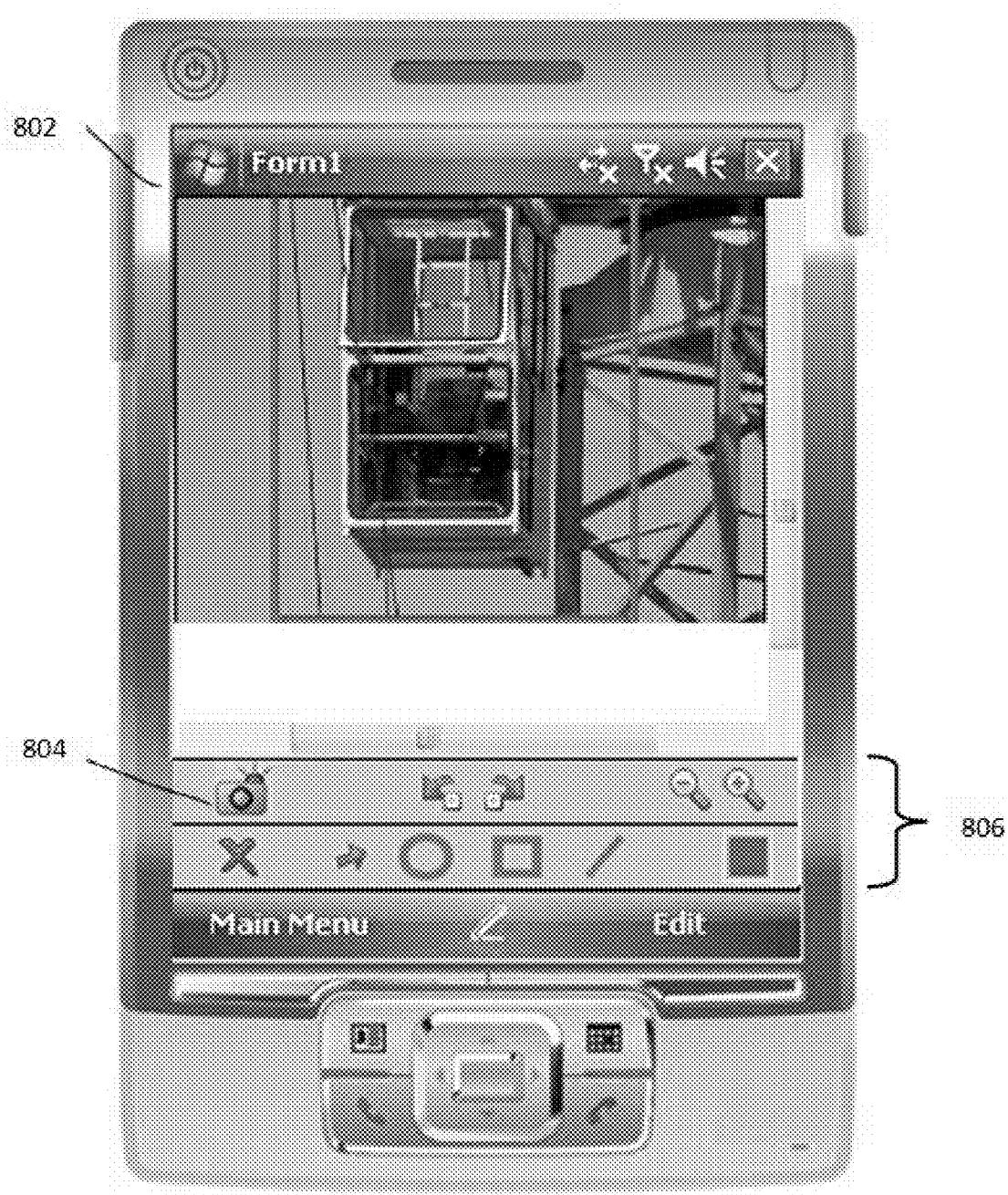
FIG. 8 is a diagram of an illustrative user interface of an inspection system, in accordance with yet another embodiment of the present industrial inspection system.

FIG. 8 is a diagram of an illustrative user interface 800 in an inspection system, in accordance with another embodiment of the present industrial inspection system. It consists of an image box 802 which is used to display an image along with overlaid objects, and a button group 806 that contains iconographic buttons for each function that the inspector can execute during the process of taking and editing a media sample. For example, if button 804 is pressed, the software activates the handheld device's digital camera and places the captured image in image box 802. Other such functions that can be found in button group 806 include undo, redo, zoom in, zoom out, delete, annotate with circle, annotate with rectangle, annotate with line, choose color, and any other function of the like. The illustrative user interface 800 is but one of many possible illustrative embodiments of the present industrial inspection system. One of ordinary skill in the art would appreciate that any other configuration of objects in a user interface, as well as any possible extensions to the set of functions presented in the user interface 800, are all within the spirit and scope of the present industrial inspection system.

Figure 9:
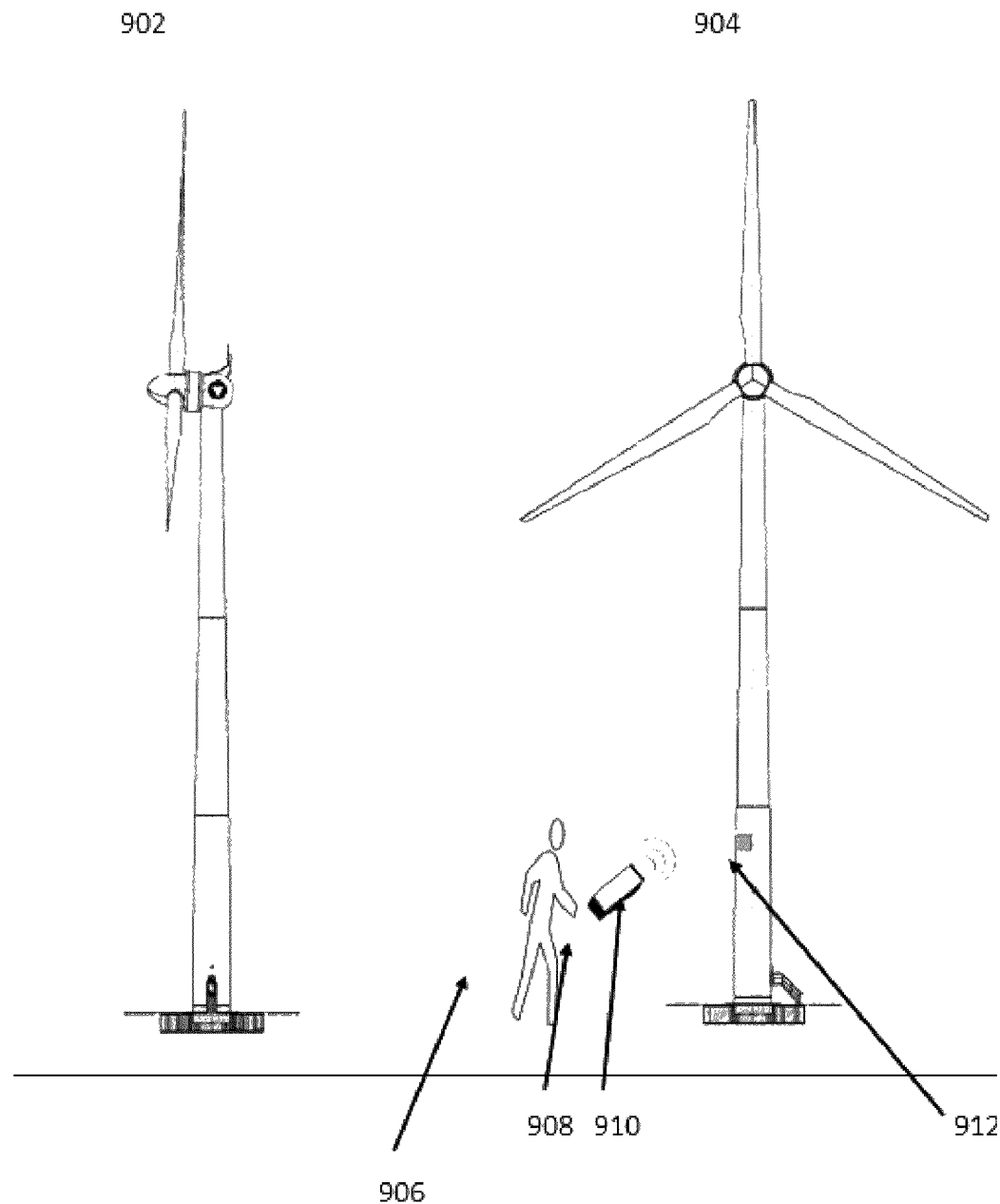
FIG. 9 is an illustration of an illustrative application of the industrial inspection system for ensuring proper inspection of wind turbines and other renewable energy systems, according to yet another embodiment of the present industrial inspection system.

FIG. 9 is an illustration of an inspector carrying out an inspection of wind turbine 902 and wind turbine 904 in accordance with yet another embodiment of the present industrial inspection system. The inspector 906 is standing next to the tower and foundation sections of wind turbine 904. The inspector 906 is using industrial inspection handheld device 908 (shown in detail in FIG. 5). Inspector 906 is more specifically in the process of using industrial inspection handheld device 908, even more specifically having an embedded RFID reader, to scan RFID tag 912 on tower section of wind turbine 904, via radio frequency communication channel 910. Since inspector 906 is within proximity of the inspected component, he is able to successfully scan the RFID tag 912 because it is within the range of radio frequency communication channel 910.

The illustration shown in FIG. 9 is but one of many possible illustrative embodiments of the usage of the present industrial inspection system. One of ordinary skill in the art would appreciate that many possible uses of the present industrial inspection system are all within the spirit and scope of the present industrial inspection system, including, but not limited to, inspections of renewable energy systems and distributed energy systems, including wind turbines, solar photovoltaic, solar thermal plants, co-generation plants, biomass-fueled power plants, carbon sequestration projects, enhanced oil recovery systems, and the like.

Some embodiments of the present industrial inspection system may contain a correlation engine and an alerting engine for correlating and alerting on patterns of behavior that may indicate potential patterns of improper inspection behavior. The correlation engine correlates any subset of inspection data segmented as inspection events, with other inspection data, as well as data coming from numerous other sources, including data from sensors and from third-party systems, as described in U.S. Pat. No. 7,382,244, filed on Oct. 4, 2007 and issued on Jun. 3, 2008, and incorporated by reference in its entirety herein. An alerting engine generates one or more alerts and performs one or more actions based on the correlation performed by the correlation engine.

Figure 10:
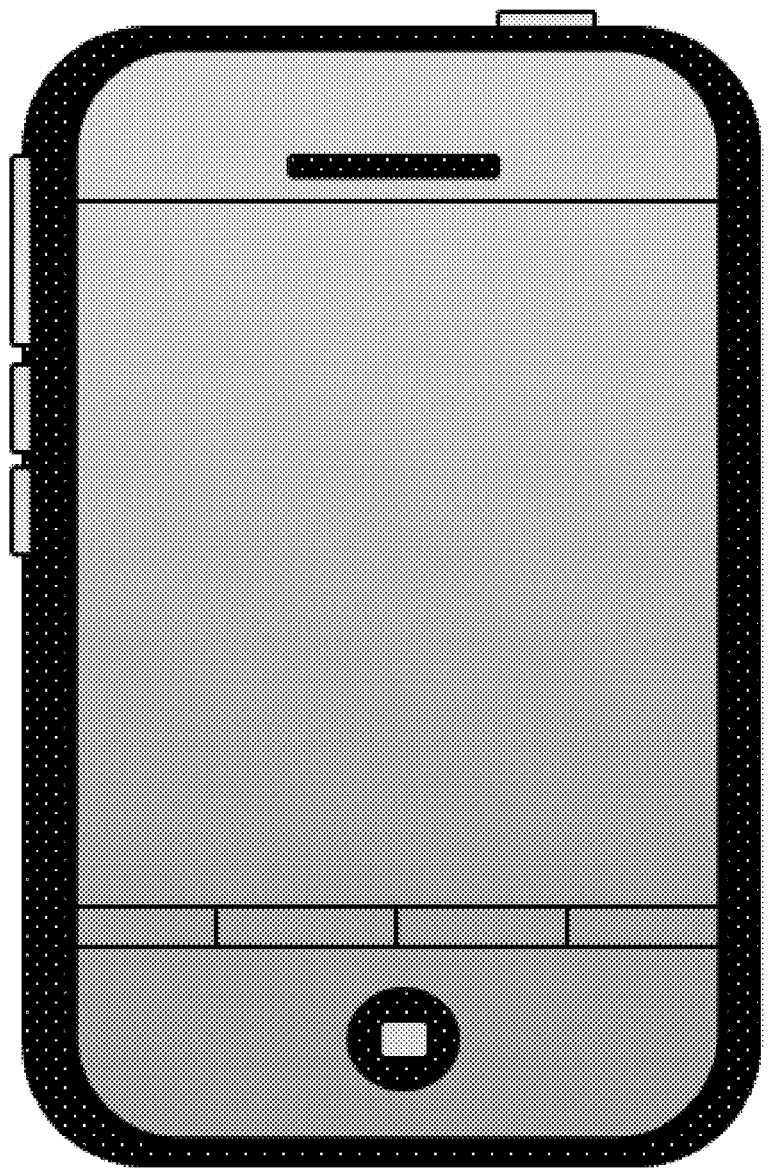
FIG. 10 is an illustration of a possible use-case of the industrial inspection system in relation to a hand-held device with a camera and a touch-sensitive display, such as an Apple iPhone® or other like device.

FIG. 10 is an illustration of a possible use-case of the present invention in relation to a hand-held device with a camera and a touch-sensitive display, such as an Apple iPhone® 1000 or other like device. Users of an Apple iPhone® 1000 may wish to generate inspection reports directly on the iPhone® 1000 together with an RFID reader that is an accessory to the iPhone for reading the machine-readable tags.

Figure 11:
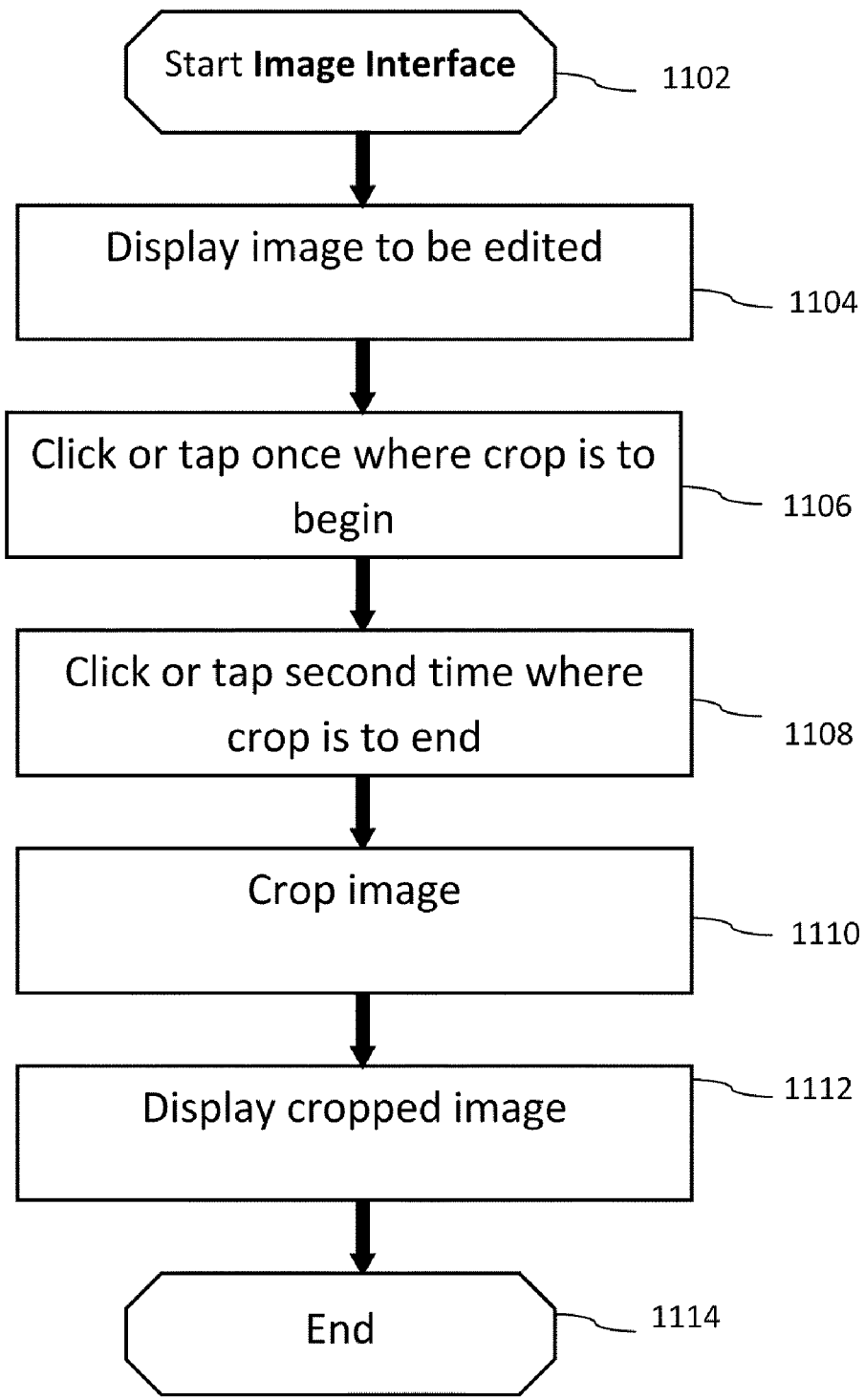
FIG. 11 shows a flowchart for a process for cropping an image or a quotation taken from a reference document on a handheld device, in accordance with one embodiment of the industrial inspection system.

FIG. 11 shows a flowchart for cropping an image taken by an imaging device or a quotation taken from a reference document using a simplified process on the handheld device ("IMAGE INTERFACE"). Process 1100 begins at step 1102, where an image is taken by an imaging device or an image is captured of a portion of the reference document, or in some other way provided to the process 1100. In step 1104, the image is displayed on the touch sensitive display or other display of the handheld device. In step 1106, the user may click or tap (using a finger, a stylus, a mouse, or other device) at a lower-left hand (LLH) location where the crop is to begin. In step 1108, the user may click or tap (using the finger, the stylus, the mouse, or other device) at an upper-right hand (URH) location where the crop is to end. (Any combination of two coordinates are also possible.) In step 1110, the image is cropped between the LLH location and the URH location. Finally, in step 1112, the cropped image is displayed for the user's confirmation. At this point (not shown), the user may cancel, undo, or accept the cropping operation. The process ends in step 1114.

Figure 12:
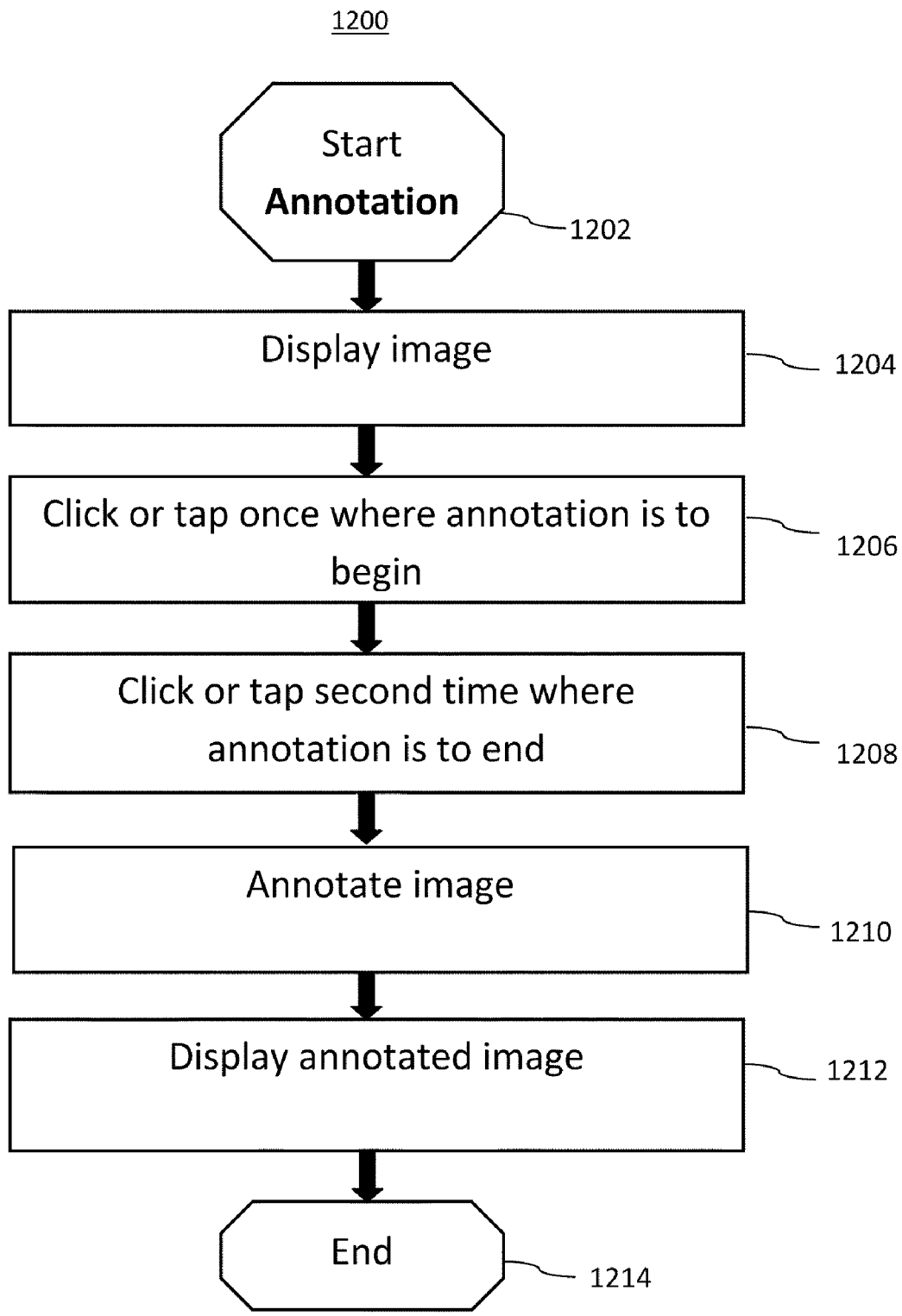
FIG. 12 shows a flowchart for a process for annotating an image or a quotation taken from a reference document on a handheld device, in accordance with one embodiment of the industrial inspection system.

FIG. 12 shows a flowchart for annotating an image taken by an imaging device or a quotation taken from a reference document using a simplified process on the handheld device ("ANNOTATION INTERFACE"). Process 1200 begins at step 1202, where the image is retrieved from memory, retrieved directly from the IMAGE INTERFACE of FIG. 11, or in some other way provided to the process 1200. In step 1204, the image is displayed on the touch sensitive display or other display of the handheld device. In step 1206, the user may click or tap (using a finger, a stylus, a mouse, or other device) at a LLH location where the annotation is to begin. In step 1208, the user may click or tap (using the finger, the stylus, the mouse, or other device) at an URH location where the annotation is to end. In step 1210, the image is annotated between the LLH location and the URH location. Finally, in step 1212, the annotated image is displayed for the user's confirmation. At this point (not shown), the user may cancel, undo, or accept the annotation operation. The process ends in step 1214.

Figure 13:
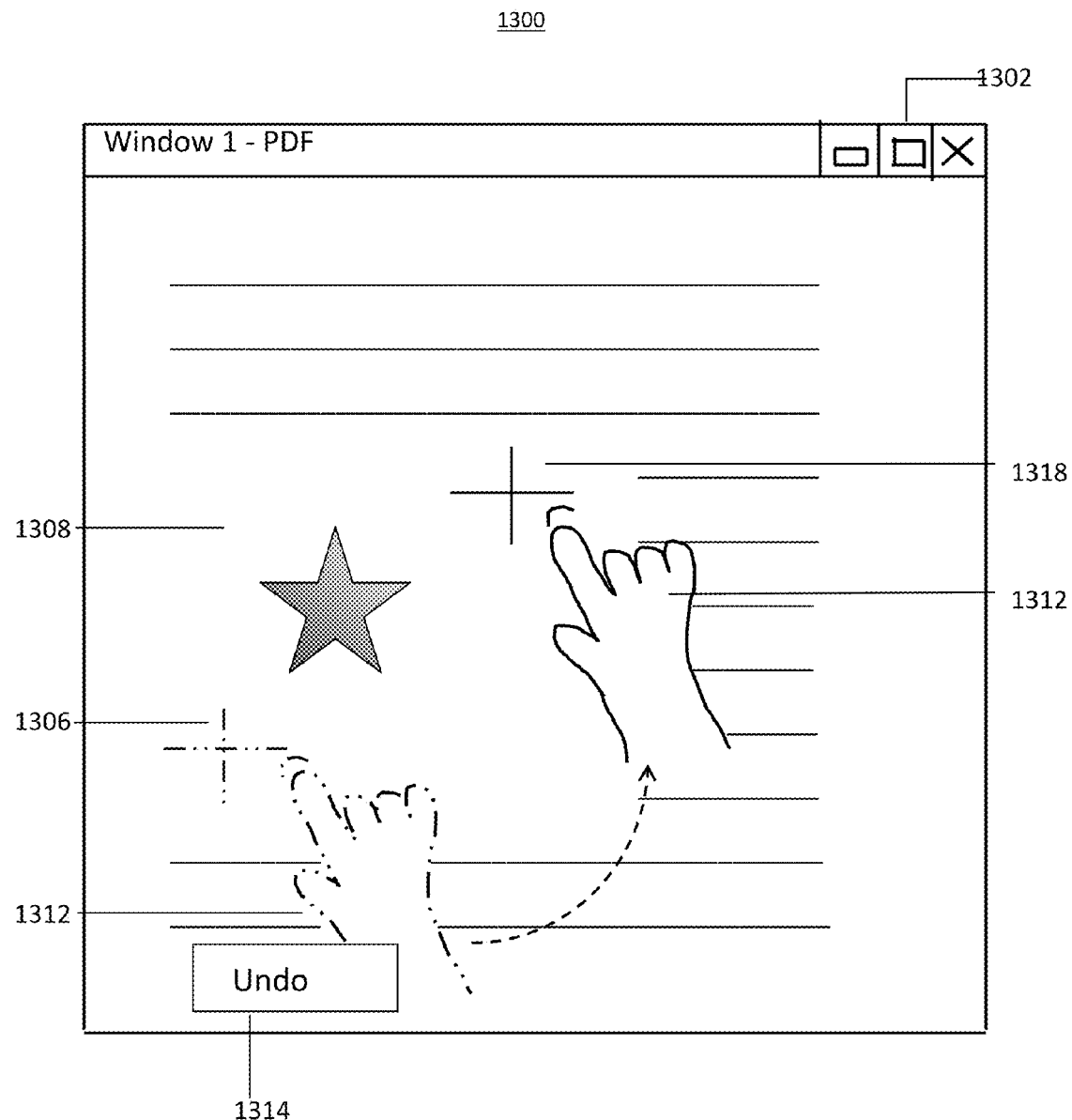
FIG. 13 illustrates a process for cropping and/or annotating an image or a quotation taken from a reference document on a handheld device, in accordance with one embodiment of the industrial inspection system.

FIG. 13 illustrates a process for cropping images taken by an imaging device or selecting and cropping quotations from a reference document on the handheld device. FIG. 13 shows the image selection step used to crop an image taken by an imagining device or to crop a quotation from a portion of the reference document 1308. As explained in the co-pending patent application Ser. No. 12/507,039, which is herein incorporated by reference, a user may use a hand 1312 (or a stylus, mouse, or other like device) to select a first point corresponding to a corner of the image to be cropped and via a simple hand movement, select a second point 1318 corresponding to an opposite corner of the image to be cropped. An iconographic button 1314 may be depressed to UNDO the crop operation and return to the captured image or the captured portion of the reference document. A second UNDO operation may return the user to the entire image or the entire reference document which may be browsed for another selection.

Therefore, as shown in reference to FIGS. 11-13, a user of the present invention may implement a selection, cropping, and annotation operation on an image or quotation with very little hand motion and very little input into the device, which is highly desirable, or even mandatory, when operating in the field, for example, during an inspection operation.

Now that the industrial inspection system and method of operation has been described in great detail, a setup or configuration operation for installing, setting up, and configuring the industrial inspection system will now be described, with reference to the parts of the industrial inspection system that need to be setup.

The first radio-frequency tags were developed and patented in the 1970s, which to date dominate the machine readable tags available on the market. Thanks to this technological breakthrough, new advancements in hardware and software continue to allow for innovative and useful organizational systems to improve the efficiency of business throughout the world. In particular, antiquated pen and paper inspection systems lack the speed, efficiency, and safety alerts that digital inspection systems offer.

The foundation of a modern digital inspection system provides a simple way to collect, analyze, and organize information in a manner that remains user friendly. A supervisor implements the hardware and software that future inspectors utilize to ensure industrial safety and inspection compliance. The supervisor can be the inspector himself. The first step in creating a useful inspection system involves physically setting up the machine-readable tags to the desired components, and inputting relevant information into a software database by the supervisor. Once the components are entered into a central database, an organizational tree or hierarchy will setup how the components relate to one another. The database software assigns unique tag identification numbers to the machine readable tags which also correlate to the physical assets. The virtual objects, which represent relationships between physical objects, include projects, installations, and storage areas while the physical objects include assets and components.

Project, installation, and storage hierarchies, also known as virtual objects, not only assist in inventory tracking, but also show the end users how to assemble the final industrial product, and ensure inspection compliance. The project is the location of the construction site where the assets are stored and combined to create the installation. The term installation in the crane and construction-hoist industries refers to a particular installation of a tower crane or hoist. The term storage area refers to the location of the disassembled industrial equipment before or after the assembly of an installation. The term logical inspection point refers to the inspection locations input by a supervisor into the inspection system that the inspector must inspect to ensure compliance. The logical inspection point associates actions required with any asset or relationship between assets. Each logical inspection point may utilize machine readable tags when needed, however, not all logical inspection points require a machine readable tag. Typically, a logical inspection point comprise inspection conditions that need to be satisfied, along with actions such as recording a media sample, time stamp, location coordinates, such as GPS or cell-phone triangulation and the like, identification of the inspector, and an encrypted security signature to confirm that inspection actions actually occurred.

In the case of an industrial rental company, the supervisor should be a licensed and qualified person from the company that installs and sets up the software and hardware for the rented industrial equipment for use by subsequent inspectors. The supervisor requires all necessary experience and safety knowledge, such as specific inspection codes, required maintenance actions, and any other relevant information required to ensure safety of the industrial equipment. Before the industrial equipment leaves the storage area, the supervisor must first input unique identification numbers of all machine readable tags and identification numbers of the unique assets that the tags refer to. The software organizes this information into a database as a hierarchy of virtual objects representing the physical assets associated with machine readable tags that will attach to the components. The supervisor physically attaches the machine readable tags to the associated components, and can take media samples, a time stamp, location coordinates, identification of the supervisor, and an encrypted security signature for use to later compare and contrast to the same information gathered by future inspectors. The media samples taken by the supervisor assist the inspector in locating the tags to scan with the tag reader, and can also verify the condition of the equipment.

The software implemented with the central database allows the supervisor to utilize pre-existing virtual components to setup new installations. If an entry inputted already exists or remains similar to an existing component in the system, the software prompts the user to avoid redundant entries. For example, the supervisor could input a control cabinet with identification number AZ48, at that time creating the "control cabinet" type in the system. Later, if he wanted to input another control cabinet with identification number AZ49, he could choose the already configured type "control cabinet" without having to create the type again. If the user chooses to edit a pre-existing component type, the database will create a new component with a unique identification number preserving the pre-existing one. After the creation of the basic organization framework, additional text-based information, such as inspection code compliance forms, GPS locations, and media samples of the physical assets, can be use with the inspection process. Instead of simply checking off inspection criteria common on traditional pen and paper solutions, the new method may in one embodiment require that the inspector take media samples of the inspection points along with recording location coordinates and annotations to provide the database submissions to include proof of inspection and feedback of any potential issues.

In order to ensure that a properly trained and authorized inspector is actually carrying out the inspection (rather than a surrogate, for example), various authentication methods may be used to authenticate the inspector, including but not limited to, biometric information, such as analogue signature, RFID swipe of card badge, photograph of inspector, thumbprint, facial recognition, eye retina scan, and the like. The inspector may be required to submit a biometric authentication as part of starting or ending an inspection report.

The interaction of hardware and software creates a virtual version out of the physical elements being tracked or inspected which makes the organization simple and easy. In one embodiment, by requiring a media sample, time stamp, location coordinates, identification of the inspector, and an encrypted security signature versus a traditional check sheet, greatly decreases of the chances of an industrial disaster. In the event that the inspector discovers a safety violation, the process of reporting the violation involves a database query for the component or components involved. The inspector can then select from a collection of violation templates previously created by the supervisor. Standards incorporated in the violation templates allow the inspector to select which codes correspond to the violation. The templates can also prompt the inspector to annotate an explanation of the violation. Citing specific code and annotating a clear explanation ensures that there is no question as to required follow-up actions. The violation template requires sections for the inspector to input media samples, a time stamp, GPS location, identification of the inspector, and an encrypted security signature to confirm that part of the inspection.

For example, a storage area could comprise a warehouse facility's loading dock or yard for long term storage, in which crane assets are transported to the project. The machine readable tags greatly assist in taking inventory of all of the crane assets while awaiting future use and help keep track of the condition and location before transportation to future projects. In this case, the project represents the construction site in which a skyscraper requires a crane. Once the crane assets arrives at the project, a pre-installation inspection utilizing the machine readable tag reader and central database software accounts for each asset by taking an inventory and ensuring that the assets arrive undamaged. After the inspection, information from the machine readable tags assists the end user with the placement and assembly of the assets to create the installation. During the assembly of the assets, the machine readable tags interface with the reader to enforce logical inspection points. For example, a three piece boom requiring tightening of the bolts and also ensuring that the boom itself remains perfectly straight and balanced. Overlooking these logical inspection points in the past caused catastrophic safety failures, which are now enforced by requiring a media sample, time stamp, GPS location, identification of inspector, and an encrypted security signature to prevent any tampering with the inspection report sent from the onsite hardware to the central database. Upon completion of the inspection, the software verifies all inspection requirements to ensure that all machine readable tags were scanned and that all required actions were completed. Once verified, the software compiles the information into a user-readable report that the device can email or print for local record keeping. This same information remains stored on the mobile device, which also copies the file to the remote central database to ensure redundancy of the inspection information. The local copy of the remote database may only synchronize from the remote database before the inspection, and any changes to the local database need to be committed or synchronized back to the main remote database only after the completion of the inspection. The inspector's rights in the information to the central database should constrain him to prevent any tampering with existing templates created by his supervisor.

According to one embodiment of the invention, the supervisor and inspector can add and retrieve parts from a list of parts previously uploaded into the central database. For example, how does an inspector get a list of assets he is inspecting when he is a part of the Department of Building (DOB), but an owner of the crane is not a subscriber to the system? The crane being inspected may not be configured for use with the industrial inspection system, and may have no machine readable tags. In the inspection industry, nobody is making a global database of parts that can be assembled on the fly by inspectors, that is, a shared editable database of industrial parts. Therefore, there would not be a need to re-enter the information if someone has already entered information about that particular industrial part before. For example, a previous user may have already put in the name, the make, the model, and the year it was first built for a particular industrial part an inspector may discover in the field, hence facilitating inspections, and particularly inspections on assets that may not have been previously configured for use with the industrial inspection compliance system.

According to one embodiment of the invention, the supervisor and inspector can add and retrieve reference documents (RefDocs, pending trademark), for example, crane manuals, part manuals, specification sheets, and any other documents related to the industrial equipment, into or from the central database. Then, the supervisor or inspector can capture, crop, and annotate a quotation, as previously described, from a PDF® of the reference document, and insert into the annotated quotation into the inspection template.

According to one embodiment of the invention, the industrial inspection and compliance system may alert on various criteria, such as patterns of events having to do with the inspectors, patterns of events having to do with assets, as well as patterns of events having to do with manufacturer's warranty, various regulator frameworks, and even "campaign bulletins."

Examples of events having to do with inspectors include schedule slips; logistics; the inspectors not being where they are supposed to be; inspectors taking too long to do inspections; inspector grading systems and performance metrics. Examples of events having to do with assets include assets that have had problems with them in the past (can now find out if a rented piece of crane equipment had problems in the past); alerts on counterfeit parts; when a tagged component isn't scanned when it leaves the storage area, gets out to the field, and is scanned, but no entry that it left the storage area; and scanning something that goes out to ship but never arrives. Examples of patterns of events having to do with manufacturer's warranty include maintenance within a designated time frame; and any other regulatory framework having to do with enforcing inspections, including federal, state, and local regulator frameworks.

Other examples of alerts include "campaign bulletins," which provide information that does not initiate a recall; however, the manufacturer believes that it warrants attention to a particular issue. This particular issue could help provide owners of assets with helpful information on proper use of the equipment to prevent potential disaster. Campaign bulletins can also include best practices and guidelines to help prevent equipment failure sent from the manufacturer to an equipment owner or renter.

Yet another example of alerts include statistical analysis to alert if, for example, an operator is authorizing more missing data than everyone else. For example, statistical analysis on users making exceptions to the sampling of normally required unique data object components at a higher than expected rate.

Figure 14:
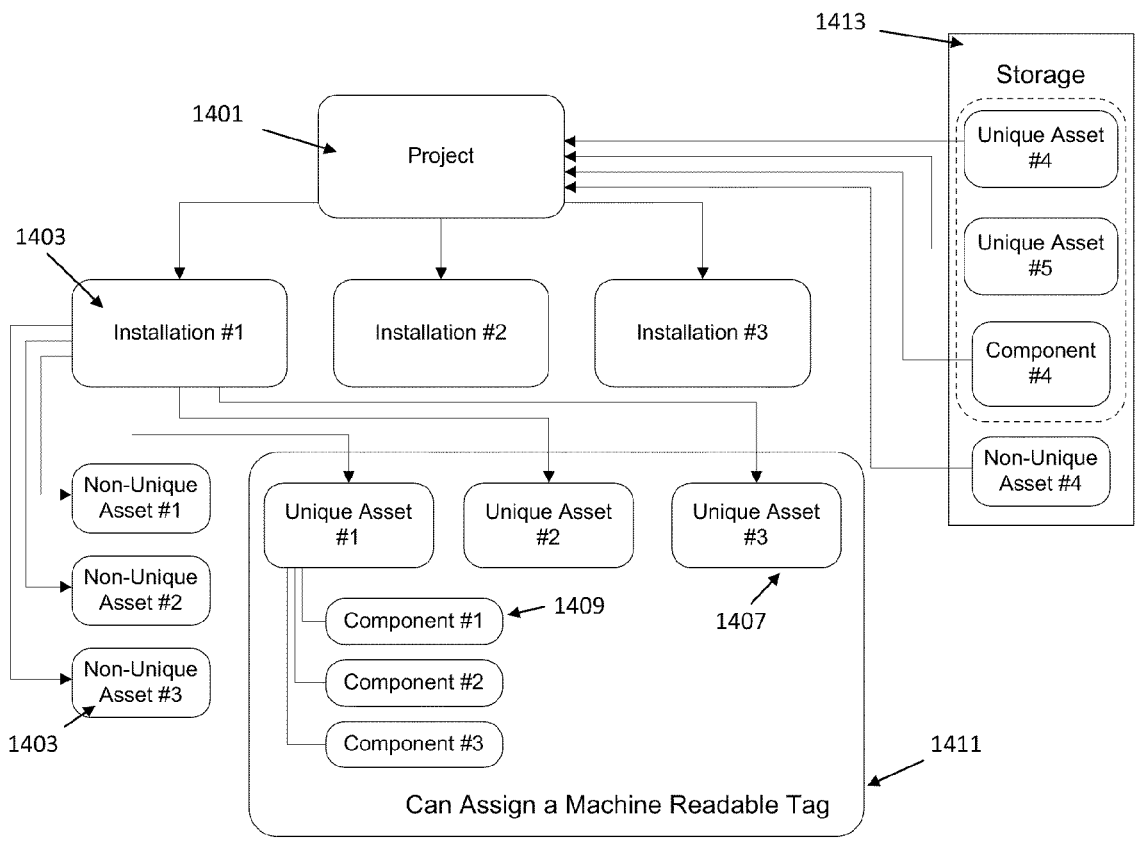
FIG. 14 shows a hierarchy of projects, installations, assets, and components in an industrial inspection system in accordance with one embodiment of the present invention.

FIG. 14 shows an organizational hierarchy of projects, installations, assets, and components in an industrial inspection system. Element 1401 represents a project, which is, for example, a location of the construction site where the assets are stored and combined to create element 1403, which represents an installation. The term installation in the crane and construction-hoist industries refers to a single predetermined installation of a tower crane or hoist. Element 1405 represents a non-unique asset, while element 1407 represents a unique asset. Assets may be stored in a storage area 1413 upon arriving and before being assembled into an installation 1403. Unique assets may be further segmented into components, such as element 1409. Dashed area 1411 surrounds unique assets.

Figure 15:
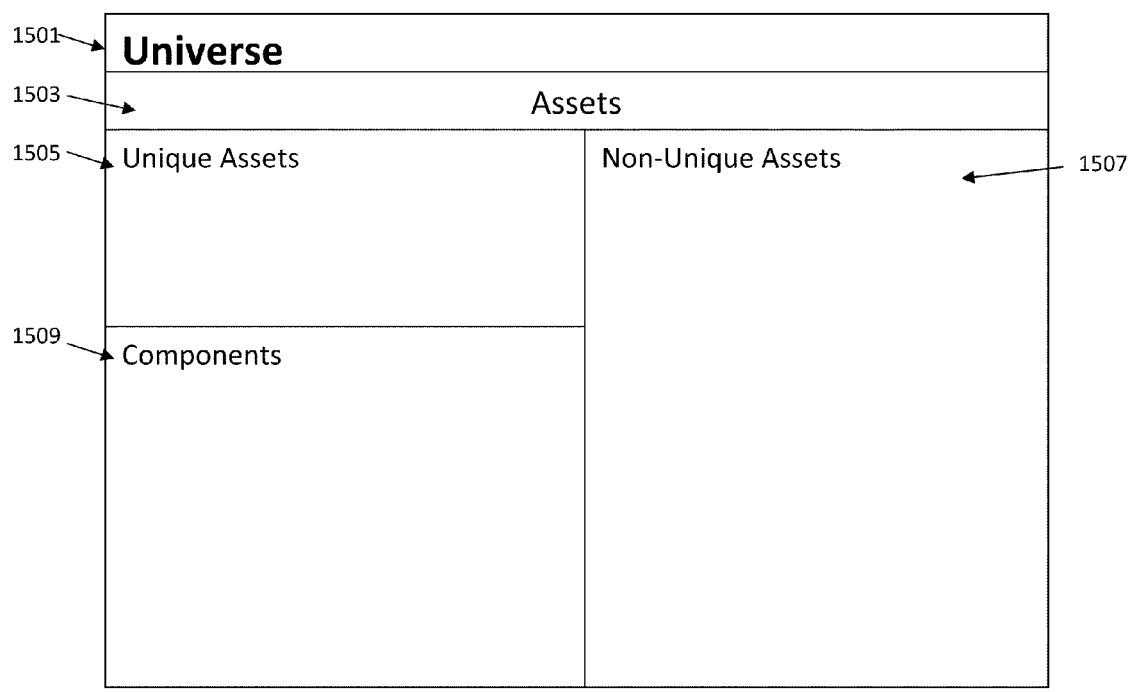
FIG. 15 shows a hierarchy of unique and non-unique assets as well as components according to one embodiment of the present invention.

FIG. 15 shows a hierarchy of unique and non-unique assets as well as components. Element 1501 encompasses any object or piece of matter which are called assets, element 1503. Assets come in two types: unique assets (element 1505) and non-unique assets (element 1507). Unique assets may be further subdivided into components (element 1509). Everything in the universe 1501 is an asset 1503 that may be tracked. Unique assets have unique serial numbers associated with each asset (e.g., each unassembled part of a crane would be a unique asset and would have a unique serial number associated with it). Unique assets may be further segmented into one or more components (a unique asset is the sum of its components, no more and no less). Every part of an asset is part of one and one component, and components do not overlap. Each component may have at most one machine readable tag. An asset may be composed of only 1 component, but an asset may not have zero components. For example, a crane boom (asset) may have a top component, a bottom component, and a middle component. Unique assets may or may not have associated machine readable tags.

Non-unique assets, in contract to unique assets, do not have unique serial numbers associated with them. For example, a bag of bolts or a box of bricks would be examples of non-unique assets. Each non-unique asset may have at most one machine readable tag. However, a non-unique asset may not be further broken down into components. Each non-unique asset may be thought of as being made up of one and only one component—itself! An installation is made up of one or more unique assets (see above), and each asset belongs to one and only one installation. An installation may also include one or more non-unique assets (see above), and each non-unique assets belongs to one and only one installation. In addition to installations, a project may have one or more storage areas, which are not part of any installation. Each storage area may have one or more unique assets as well as one or more non-unique assets.

Figure 16:
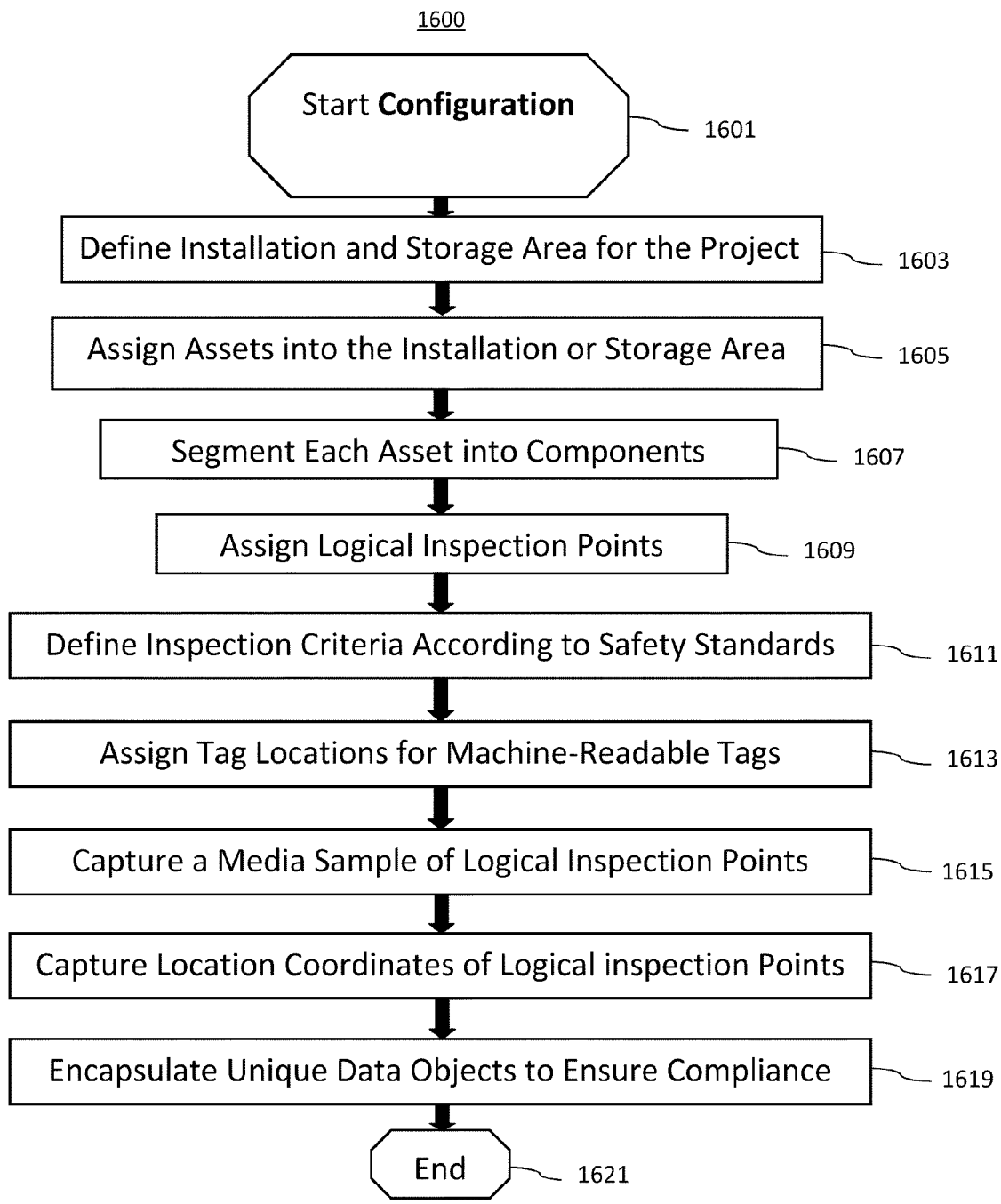
FIG. 16 shows a flowchart for installing and configuring the industrial inspection compliance system on a handheld device, in accordance with one embodiment of the invention.

FIG. 16 shows a flowchart of a process 1600 for installing and configuring an industrial inspection system on a handheld device. The process starts at step 1601, and then moves to step 1603 which allows for the definition of storage area(s) and installation(s). Next, step 1605 assets are assigned into either storage areas or installations. In step 1607, the unique assets are further segmented into components. Once all the assets are defined, at step 1609, logical inspection points are assigned, which may include inspection criteria and standard codes required to be evaluated by an inspector. After completion of the inspection setup information, in step 1613, tag locations are assigned for each machine readable tag. Once physically attached, in step 1615, a media sample of each machine readable tag is captured, which helps locate the tag for future inspections. In step 1617, location coordinates of the logical inspection points are captured to ensure inspection compliance, and assist with inventory of the assets. Inventory of the machine readable tags also assists with the prevention of counterfeit assets being switched with authentic assets. After all data required by the inspection setup are collected, a unique data object is encapsulated storing all of this information, as shown in step 1619. The process ends in step 1621.

In one embodiment, a data object is stored for at least one logical inspection point, containing each of a machine readable tag, a media sample, and a location coordinate of the logical inspection point. According to one embodiment of the invention, when one of these data is not available (due to a broken device, bad gps signal, etc.), it is possible to store the absence of said data as well, possibly requiring an operator signature or biometric to authorize the missing data. For example, the unique machine-readable tag serial number object can consist of either the unique machine-readable tag serial number itself or an explanation of why the unique machine-readable tag serial number was not available along to a biometric or digital signature. In VB code, Nullable(Of UniqueMachineReadableTagSerialNumber). For example, the media sample object can consisting of either the media sample itself or an explanation of why a media sample was not taken along with a biometric or digital signature. In VB code, Nullable(Of MediaSample). For example, the location coordinates object can consist of either the location coordinates themselves or an explanation of why the location coordinates were not available along to a biometric or digital signature. In VB code, Nullable(Of LocationCoordinates). An absence of any component of the unique data object is may be replaced with an explanation of why it was not included.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention. While the invention has been particularly shown and described with reference to embodiments thereof, it will be understood by those skilled in the art that various other changes in the form and details may be made without departing from the spirit and scope of the invention

What is claimed is:

1. A method for configuring assets for use with an industrial inspection compliance system, comprising the steps of:
   assigning one or more logical inspection points to each components of the assets;
   defining one or more inspection criteria according to one or more safety standards documents for one or more of the logical inspection points, the safety standard documents containing one or more safety code standards which an inspector can reference in justifying a violation or a work order to correct a violation;
   assigning tag locations for a radio-frequency identification (RFID) tag having a unique serial number at or near one or more of the logical inspection points;
   capturing a photograph of one or more of the logical inspection points;
   capturing global positioning system (GPS) coordinates of one or more of the logical inspection points; and
   encapsulating a unique data object for at least one of the logical inspection points using a computer processor, each data object storing the unique RFID tag serial number at said logical inspection point, the photograph of said logical inspection point, and the GPS coordinates of said logical inspection point, which the industrial inspection compliance system later uses to ensure compliance by ensuring actual visitation to said logical inspection point,
   wherein the industrial inspection compliance system can annotate the photograph at one or more of the logical inspection points to indicate a safety violation according to one of the safety documents.

2. The method as recited in claim 1, further comprising:
   inputting asset information corresponding to one or more of the logical inspection points.

3. The method as recited in claim 1, further comprising:
   capturing a photograph of a location of one or more of the RFID tags;
   cropping each photograph to a desired size using two touches; and
   annotating status information for said RFID tag.

4. The method as recited in claim 1, further comprising:
   assigning each RFID tag a unique serial number; and
   attaching each RFID tag at each unique asset.

5. The method as recited in claim 1, further comprising:
   selecting one or more components that are to be inspected as part of the industrial inspection.

6. The method as recited in claim 5, further comprising:
   assigning an organizational tree that encompasses an assembly of the assets, and the components.

7. The method as recited in claim 1, further comprising:
   utilizing previously inputted setup information, and components already in a central database; and
   submitting new asset information, and component information to the central database.

8. The method as recited in claim 1, further comprising:
   inputting data into a template containing required codes needed for automated future post-inspection report generation.

9. The method as recited in claim 1, further comprising:
   defining one or more biometric signatures that must be satisfied by an inspector using the industrial inspection system to authenticate an authority of the inspector.

10. The method of claim 9, wherein the biometric signature is selected from the group consisting of signature, RFID swipe of card badge, photograph of inspector, and thumbprint.

11. The method as recited in claim 1, further comprising:
    adding parts from a list of parts previously uploaded into the central database.

12. The method as recited in claim 1, further comprising:
    retrieving one or more reference documents from the central database;
    selecting an excerpt from the one or more reference documents; and
    inserting the excerpt into an inspection template.

13. The method as recited in claim 1, further comprising:
    sending one or more alerts on selected criteria, wherein the selected criteria include patterns of events having to do with inspectors, patterns of events having to do with assets, and patterns of events having to do with manufacturer's warranty.

14. A computer system for configuring assets for use with an industrial inspection compliance system, the system comprising:
    one or more memories for storing program code;
    one or more communication links to a remote database storing all configuration data related to the industrial inspection compliance system; and
    one or more processors, operatively connected to the one or more memories, for executing the stored program code, which when executed causes the system to perform a process comprising the steps of:
       assigning one or more logical inspection points to each component of the assets;

defining one or more inspection criteria for one or more of the logical inspection points;

assigning tag locations for a radio frequency identification (RFID) tag having a unique serial number at one or more of the logical inspection points;

capturing a photograph of one or more of the logical inspection points;

capturing global positioning system (GPS) coordinates for one or more of the logical inspection points; and encapsulating a unique data object for one or more of the logical inspection points using a computer processor, each data object storing the unique RFID tag serial number at said logical inspection point, the photograph of said logical inspection point, and the GPS coordinates of said logical inspection point, which the industrial inspection compliance system later uses to ensure compliance by ensuring actual visitation to said logical inspection point.

15. The system as recited in claim 14, wherein the one or more processors execute a process further comprising:

assigning an organizational tree for each installation that encompasses an assembly of the assets, and the components.

16. The system as recited in claim 14, wherein the one or more processors execute a process further comprising:

utilizing previously inputted setup information, assets, and components already in a central database; and submitting new asset information component information to the central database.

17. The system as recited in claim 14, wherein the one or more processors execute a process further comprising:

defining one or more biometric signatures that must be satisfied by an inspector using the industrial inspection system to authenticate an authority of the inspector.

18. The system as recited in claim 14, wherein the one or more processors execute a process further comprising:

retrieving one or more reference documents from the central database;

selecting an excerpt from the one or more reference documents; and inserting the excerpt into an inspection template.

19. The system as recited in claim 14, wherein the one or more processors execute a process further comprising:

sending one or more alerts on selected criteria, wherein the selected criteria include patterns of events having to do with inspectors, patterns of events having to do with assets, and patterns of events having to do with manufacturer's warranty.

20. A method for configuring a project for use with an industrial inspection compliance system, comprising the steps of:

defining one or more inspection criteria according to one or more safety standards documents for one or more logical inspection points of the project, wherein the safety standard documents contain one or more safety code standards which an inspector can reference in justifying a violation or a work order to correct the violation; and encapsulating a unique data object for at least one of the logical inspection points using a computer processor, each data object storing a unique radio frequency identification (RFID) tag serial number, a photograph, and global positioning system (GPS) coordinates of said logical inspection point, which the industrial inspection compliance system later uses to ensure compliance by ensuring actual visitation to said logical inspection point.

\* \* \* \* \*